(12) United States Patent
Nasiri et al.

(10) Patent No.: US 8,170,408 B2
(45) Date of Patent: May 1, 2012

(54) OPTICAL IMAGE STABILIZATION IN A DIGITAL STILL CAMERA OR HANDSET

(75) Inventors: Steven S. Nasiri, Saratoga, CA (US);
Mansur Kiadeh, Cupertino, CA (US);
Yuan Zheng, Fremont, CA (US);
Shang-Hung Lin, San Jose, CA (US);
Sheena Shi, Sunnyvale, CA (US)

(73) Assignee: Invensense, Inc., Sunnyvale, CA (US)

( * ) Notice: Subject to any disclaimer, the term of this patent is extended or adjusted under 35 U.S.C. 154(b) by 0 days.

(21) Appl. No.: 12/726,244

(22) Filed: Mar. 17, 2010

(65) Prior Publication Data

US 2010/0290769 A1 Nov. 18, 2010

Related U.S. Application Data

(60) Provisional application No. 61/179,344, filed on May 18, 2009.

(51) Int. Cl.
*G03B 17/00* (2006.01)
(52) U.S. Cl. ............ 396/55; 348/208.2; 348/208.6
(58) Field of Classification Search .......... 396/55; 73/510–511; 348/208.6
See application file for complete search history.

(56) References Cited

U.S. PATENT DOCUMENTS

| | | | | |
|---|---|---|---|---|
| 4,485,400 A | * | 11/1984 | Lemelson et al. | 348/14.01 |
| 5,920,478 A | * | 7/1999 | Ekblad et al. | 700/29 |
| 6,848,304 B2 | * | 2/2005 | Geen | 73/504.04 |
| 6,915,215 B2 | * | 7/2005 | M'Closkey et al. | 702/32 |
| 7,263,040 B2 | * | 8/2007 | Tateishi et al. | 369/44.29 |
| 2006/0251410 A1 | * | 11/2006 | Trutna | 396/55 |
| 2008/0309786 A1 | * | 12/2008 | Archibald et al. | 348/222.1 |
| 2009/0007103 A1 | * | 1/2009 | Bennett et al. | 718/1 |
| 2009/0040317 A1 | * | 2/2009 | Park et al. | 348/208.2 |
| 2009/0073601 A1 | * | 3/2009 | Uchida et al. | 360/77.04 |
| 2010/0098394 A1 | * | 4/2010 | Ishihara et al. | 396/55 |

FOREIGN PATENT DOCUMENTS

JP 2000137960 A * 5/2000

OTHER PUBLICATIONS

Providing the english translation, JP2000-137960A.*
D. H. Yeom et al., "Digital Controller of Novel Voice Coil Motor Actuator for Optical Image Stabilizer," International Conference on Control, Automation and Systems, Oct. 17-20, 2007, Seoul, Korea.
Jung-Ho Moon and Soo Yul Jung, "Implementation of an Image Stabilization System for a Small Digital Camera," IEEE Transactions on Consumer Electronics, vol. 54, No. 2, May 2008, pp. 206-212.

* cited by examiner

*Primary Examiner* — W. B. Perkey
*Assistant Examiner* — Linda B Smith
(74) *Attorney, Agent, or Firm* — Sawyer Law Group, P.C.

(57) ABSTRACT

An optical image stabilization system for a camera module is disclosed. The stabilization system comprises a voice coil motor (VCM), at least one digital gyroscope for receiving signals from the VCM, and an angular velocity sensor for receiving signals from the digital gyroscope and outputting an angular position error signal. The stabilization system further comprises signal processing logic for receiving the error signal, and comparing the error signal to a reference signal and providing a stabilized image based upon that comparison, wherein the hard-coded logic, digital gyroscope and rate and position sensor resides on the same chip.

22 Claims, 38 Drawing Sheets

| FREQ(Hz) | REJECTION(dB) |
|---|---|
| 2 | 36 |
| 4 | 33 |
| 6 | 34 |
| 8 | 38 |
| 10 | 55 |
| 12 | 35 |
| 14 | 30 |
| 16 | 25 |
| 18 | 23 |

FIG. 15J

| FREQ(Hz) | REJECTION(dB) |
|---|---|
| 2 | 36 |
| 4 | 34 |
| 6 | 35 |
| 8 | 40 |
| 10 | 55 |
| 12 | 70 |
| 14 | 54 |
| 16 | 40 |
| 18 | 37 |

FIG. 15L

| FREQ(Hz) | REJECTION(dB) |
|---|---|
| 2 | 53 |
| 4 | 50 |
| 6 | 52 |
| 8 | 60 |
| 10 | 76 |
| 12 | 64 |
| 14 | 60 |
| 16 | 63 |
| 18 | 60 |

FIG. 15N

| FREQ(Hz) | REJECTION(dB) |
|---|---|
| 2 | 53 |
| 4 | 46 |
| 6 | 43 |
| 8 | 42 |
| 10 | 43 |
| 12 | 44 |
| 14 | 47 |
| 16 | 62 |
| 18 | 48 |

FIG. 15P

OPTICAL IMAGE STABILIZATION IN A DIGITAL STILL CAMERA OR HANDSET

CROSS REFERENCE TO RELATED APPLICATION

This application claims the benefit of priority of U.S. Patent Application No. 61/179,344, entitled "OPTICAL IMAGE STABILIZATION IN A DIGITAL STILL CAMERA OR HANDSET," filed on May 18, 2009, which is incorporated herein by reference.

FIELD OF THE INVENTION

The present invention relates generally to handsets with optical capability, and more particularly to optical image stabilization for such handsets.

BACKGROUND OF THE INVENTION

Typically, as handsets and digital still cameras have gotten smaller and smaller in size, there have always been challenges to try to improve their optical performance. Accordingly, the methodology requires more accurate optical image stabilization as the cameras increase in the number of pixels per image. That means the camera module must be able to control blurring of an image due to hand jitter when taking picture as picture resolution increases. In addition a camera module must be robust and have a high tolerance to shock and vibration. In addition the module must be made as small as possible and provide significant integration to allow its use in a variety of environments. Finally the cost of the camera module must be as small as possible to allow its incorporation in various types of handsets. At the present time, no system addresses all of these criteria in an adequate manner. That is, heretofore no system provides for the integration of components required at a low cost and also provides for a robust design. To describe some of the issues with conventional camera modules refer now to the following description in conjunction with the accompanying figures.

FIGS. 1A and 1B are top and side views respectively of a conventional camera module 10. Referring to both figures, the camera module 10 includes a voice coil motor (VCM) 12, a dual axis gyroscope 14, an image sensor 16 within the module 10, a Hall element 18, and an optical image stabilization (OIS) controller 20 coupled to the image sensor 16 and the Hall element 18.

As is seen, the image sensor 16 is located within the module 10. The dual axis gyro 14, the at least one Hall element 18 and the OIS controller 20 are all located outside the module 10. In addition the at least one Hall element 18 is used as position feedback sensor in the image stabilization for the module 10.

FIG. 1C is a block diagram representation of the camera module 10 of FIGS. 1A and 1B. As is seen in FIG. 1C, the dual axis gyroscope 14 transfers the rotational motion of the camera into electronic signal and this angular velocity signal is sampled into digital signal and is further processed into camera position signal via the DSP module 22, which will be used by the OIS controller 20. The OIS controller 20 also takes the lens module position sensor signal from the path of Hall element 18 and its amplifier 26. Then the position signal from Hall element is compared with that from Gyro to generate the error signals. This error signal is sent to the actuator driver 24, then to VCM actuator 24 to make a correction motion for lens module.

This approach has several problems. The use of a Hall element 18 requires a significant amount of additional hardware and circuitry. For example, there is circuitry required to excite the Hall element 18 when there is a change in position and there is also circuitry required to sense the change of the Hall element 18 in position. In addition, the control algorithms required to control the module are relatively complex and require separate hardware.

Accordingly, the Hall element and its associated circuitry provide a level of complexity to the design that affects the cost and the performance of the module during image stabilization. Therefore it is desirable to provide an OIS controller for a camera module that addresses all criteria related to improving their performance that is small in size, having increased optical image stabilization, being very robust and being low in cost. Presently conventional camera modules do not address all four of these criteria in an effective manner.

Accordingly, what is desired is to provide an optical image stabilization method and system in a camera module which would overcome the above-identified issues. The method and system should be easy to implement, cost-effective, and adaptable to existing systems. The present invention addresses such a need.

SUMMARY OF THE INVENTION

An optical image stabilization system for a camera module is disclosed. The stabilization system comprises a voice coil motor (VCM), at least one digital gyroscope for receiving signals from the VCM, and an estimator based controller to process the signals from the digital gyroscope and a reference comparator to output a loop error signal. The stabilization system further comprises hard coded logic for receiving the error signal, and comparing the error signal to a reference signal and providing a stabilized image based upon that comparison, wherein the signal processing logic, digital gyroscope and estimator based controller resides on the same chip.

DETAILED DESCRIPTION

The present invention relates generally to handsets with optical capability, and more particularly to optical image stabilization for such handsets. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention provides an optical image stabilization system that is fully integrated. The system is high performance, low cost, small size, and very robust. In this system, the estimator based controller uses the gyroscope to precisely calculate the angular position for optical image stabilization (OIS) purposes and therefore there is no need for a position sensor or Hall element as is utilized in conventional modules. Utilizing this system minimal communication between the module and the access point is required for the handset. In this system, the control and drive electronics can be implemented primarily through signal processing logic that will allow for greater integration than in previous OIS systems.

Utilizing a system and method in accordance with the present invention will allow for less phase delay due to a high bandwidth gyro and a unique control loop design. The system and method also include a stabilized module and high shock tolerance gyroscope which provides for an inherent high robustness design. Through the use of a system and method in accordance with the present invention, there is significant improvement over conventional optical image stabilization systems. To describe the features of the present invention in more detail, refer now to the following description in conjunction with the accompanying figures.

Figure 1A:
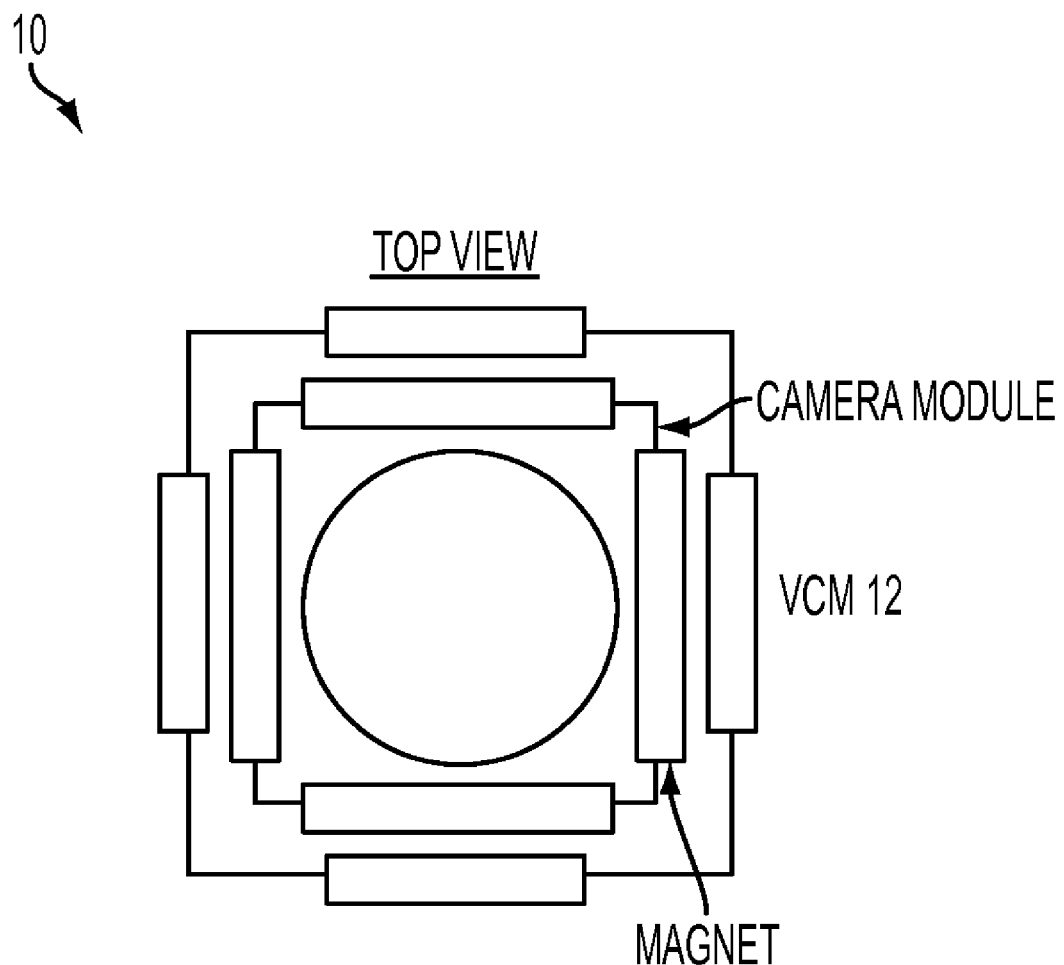
FIG. 1A is a top view of a conventional camera module.
Figure 1B:
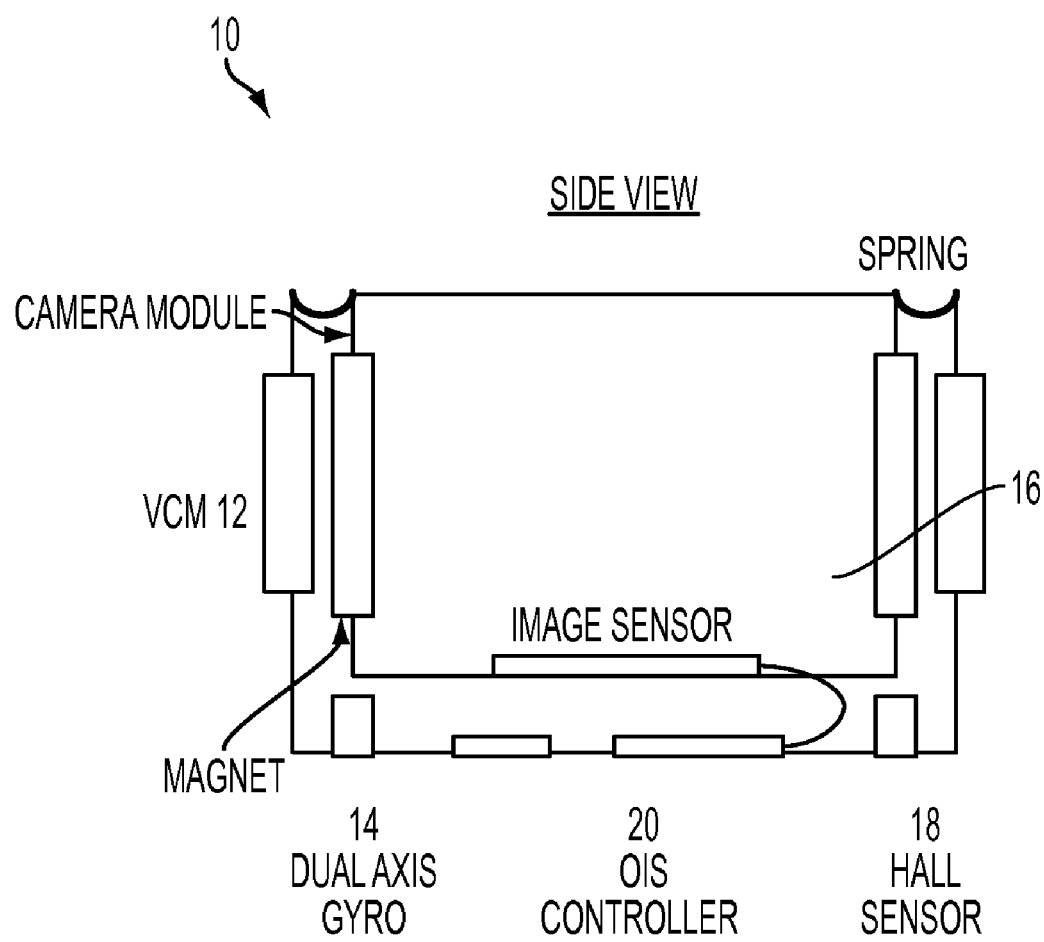
FIG. 1B is a side view of a conventional camera module.
Figure 1C:
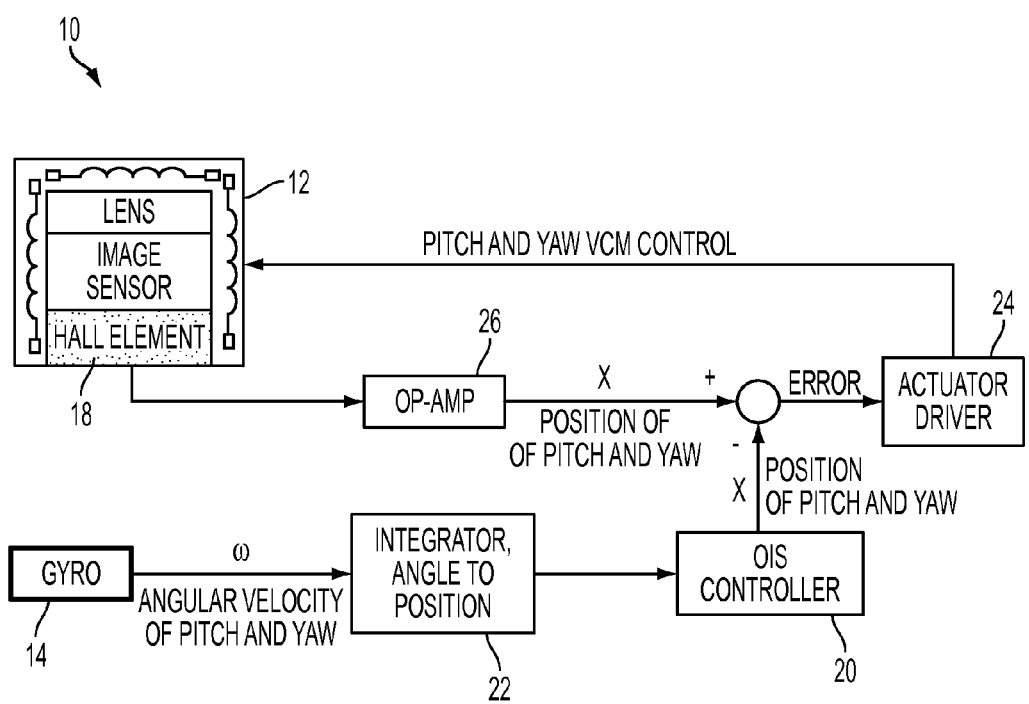
FIG. 1C is a block diagram representation of the camera module of FIGS. 1A and 1B.
Figure 2A:
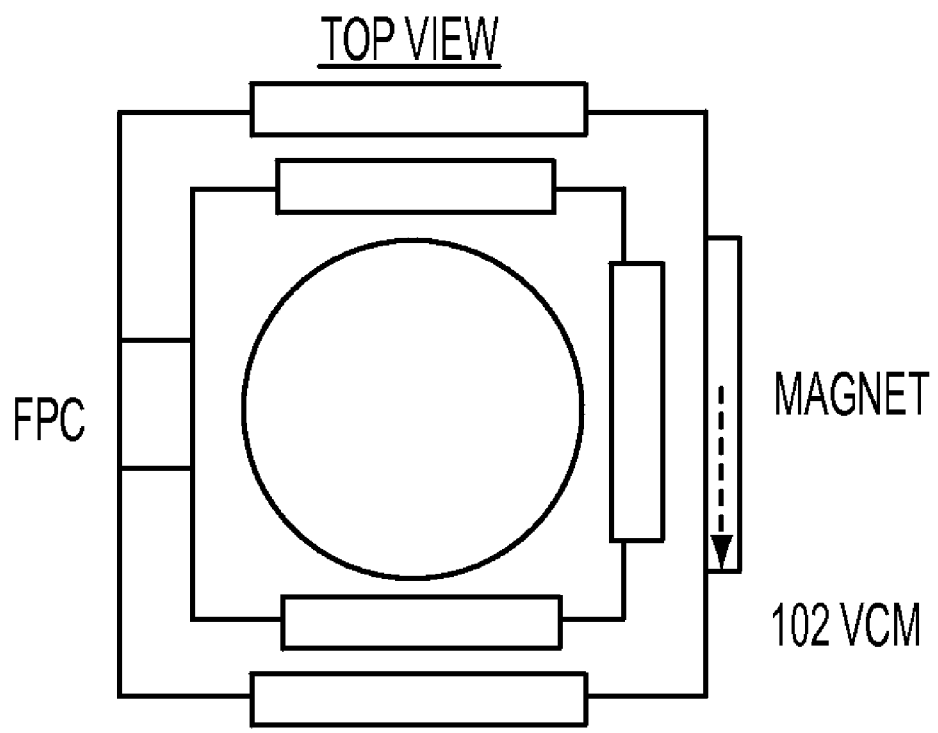
FIG. 2A illustrates a top view of a camera module in accordance with the present invention.
Figure 2B:
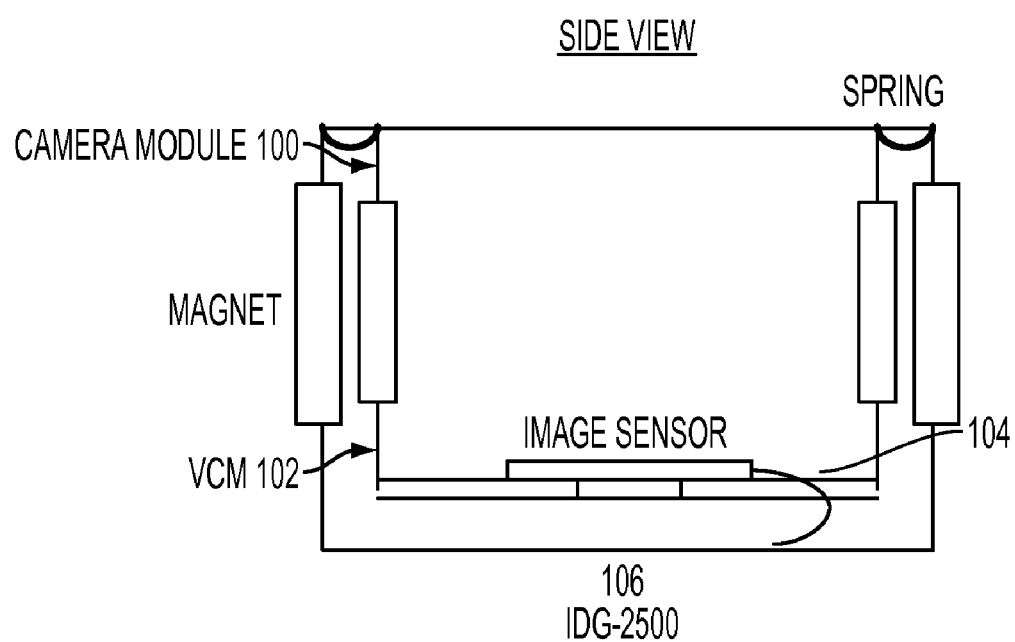
FIG. 2B illustrates a side view of a camera module in accordance with the present invention.
Figure 2C:
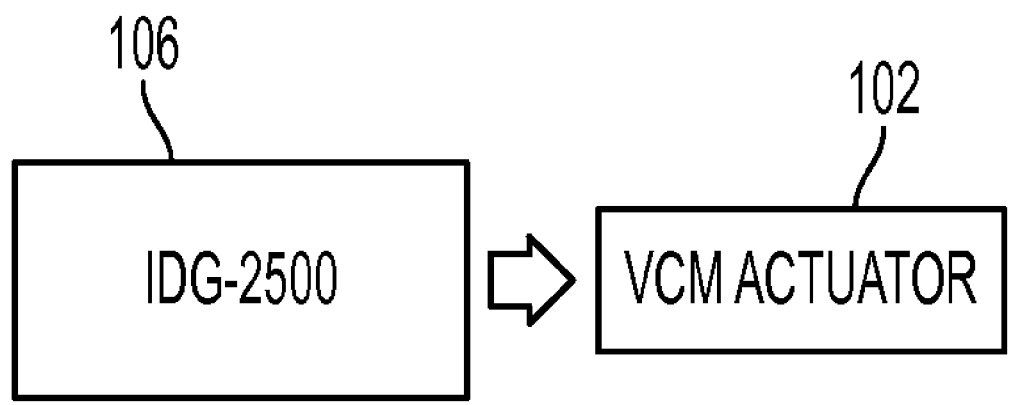
FIG. 2C illustrates an optical image stabilization (OIS) controller including the optical image stabilization circuitry and systems and is coupled to the voice coil module.

FIGS. 2A and 2B are top and side views, respectively, of a camera module 100 in accordance with the present invention. The camera module 100 includes a voice coil module (VCM) 102, and an image sensor 104 inside the camera module 100. The image sensor 104 in turn is on top of an optical image stabilization (OIS) controller 106. Referring to FIG. 2C, the OIS controller 106 includes the optical image stabilization circuitry and systems and is coupled to the voice coil motor (VCM) 102.

Figure 3A:
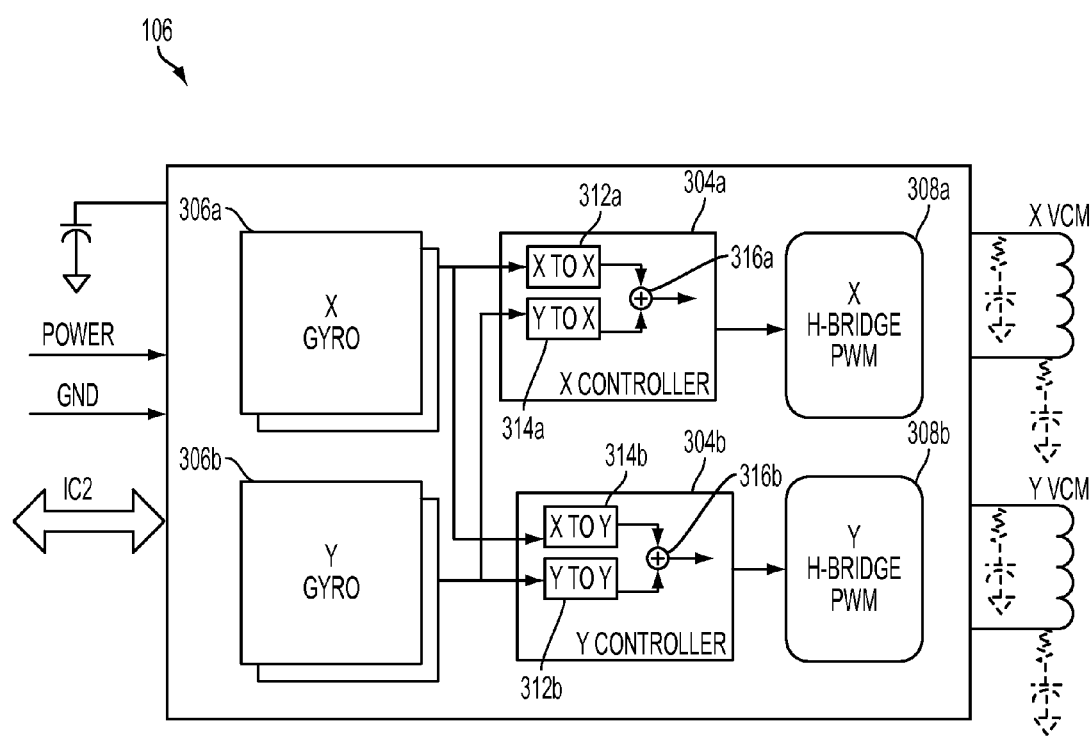
FIG. 3A illustrates the block diagram of matrix transfer servo controller.

FIG. 3A illustrates the main blocks of an optical image stabilization controller 106. Included within the controller 106 are the gyroscopes 306a and 306b for x and y directions with their respective controllers 304a and 304b. Each of the controllers 304a and 304b include 2 by 2 matrix transfer function which handles a dynamic coupling of the tilt 314a in the y direction of x controller 304a a tilt 314b in x direction of y controller 304b. Each of the controllers 304a and 304b also includes a summer 316a and 316b. The OIS controller also includes pulse width modulators (PWMs) 308a and 308b associated with the controllers 304a and 304b.

In utilizing this type of VCM actuation within a compact camera module (CCM), the rotation movement along the x and y axis has a dynamic coupling, i.e., the x axis rotation will tilt the CCM in y axis, which can be picked up by the y gyro sensor and the y-axis rotation will tilt the CCM in the x-axis which can be pushed up by the x gyro sensor. This dynamic of the CCM causes the system to become a multi-input-multi-output (MIMO) system.

A multivariable servo control architecture can reduce the errors caused by this complex cross-coupling. In the frequency domain, a 2×2 matrix transfer function is needed, such as shown in FIG. 3A.

Figure 3B:
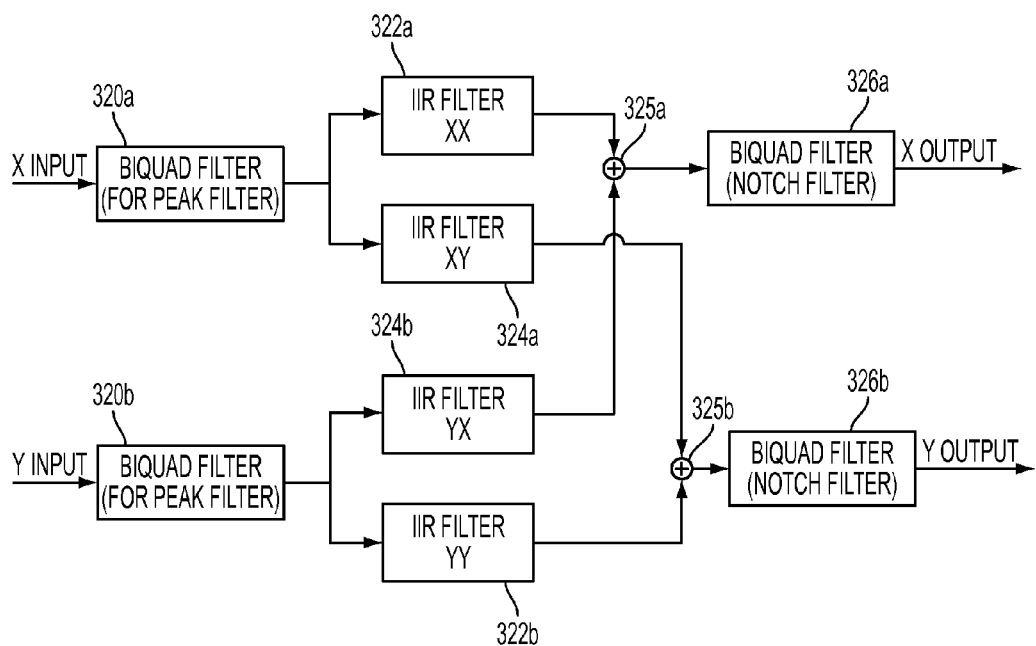
FIG. 3B illustrates the reconfigurable MIMO control architecture.

The controller has reconfigurable structure. A basic configuration of the controller is shown in FIG. 3B. This configuration includes for the x input a bi-quad filter 320a, which sends signals to IIR filter 322a and IIR filter 324a. The IIR filter 322a sends a signal to summer 325a. The IIR filter 324a sends a signal to summer 325b. For the y input, a bi-quad filter 320b sends a signal to IIR filter 324b and IIR filter 322b. The IIR filter 324b sends a signal to summer 325a. IIR filter 322b sends a signal to summer 325b. In an embodiment, the bi-quad filter is a second order filter, while the IIR filters are cascade $4^{th}$ order filters made of a first order filter elements.

The parameters of all the filter elements can be programmable through an SPI interface. The flexible filter structure can bypass and disable (through gated clock) any of the filter elements if they are not in use by the VCM actuation mechanism. In this way, the power consumption is greatly reduced.

Figure 3C:
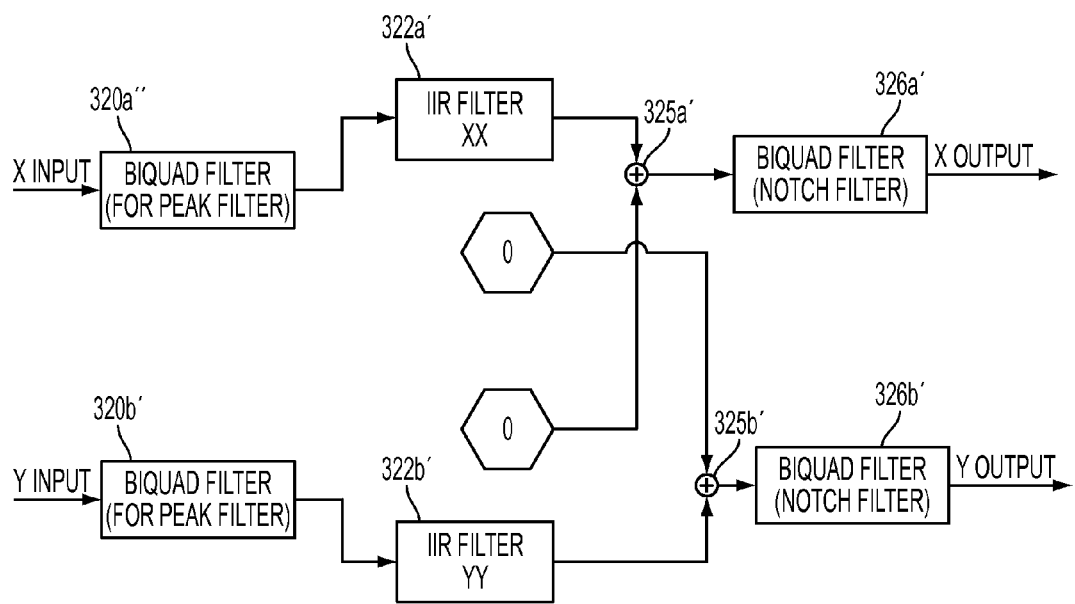
FIG. 3C illustrates the reduced control architecture for a compact camera module CCM.

For a CCM with excellent mechanical design of the VCM actuator, (the coupling between X and Y axis is small enough to have impact on the servo control design) the number of active elements of the MIMO controller can be reduced to the single in/single out (SISO) case, which is shown in FIG. 3C.

In a preferred embodiment, a digital signal processor (DSP) core performs the controller functions 412a and 412b via signals received from a plurality of A/D converters. The A/D converters are preferably 16 bit sigma delta converters 416a and 416b for each of the x-axis gyroscope 306a and y axis gyroscope 306b. In addition there is one H-bridge PWM 308a and 308b per axis to drive the VCM actuator.

Figure 4:
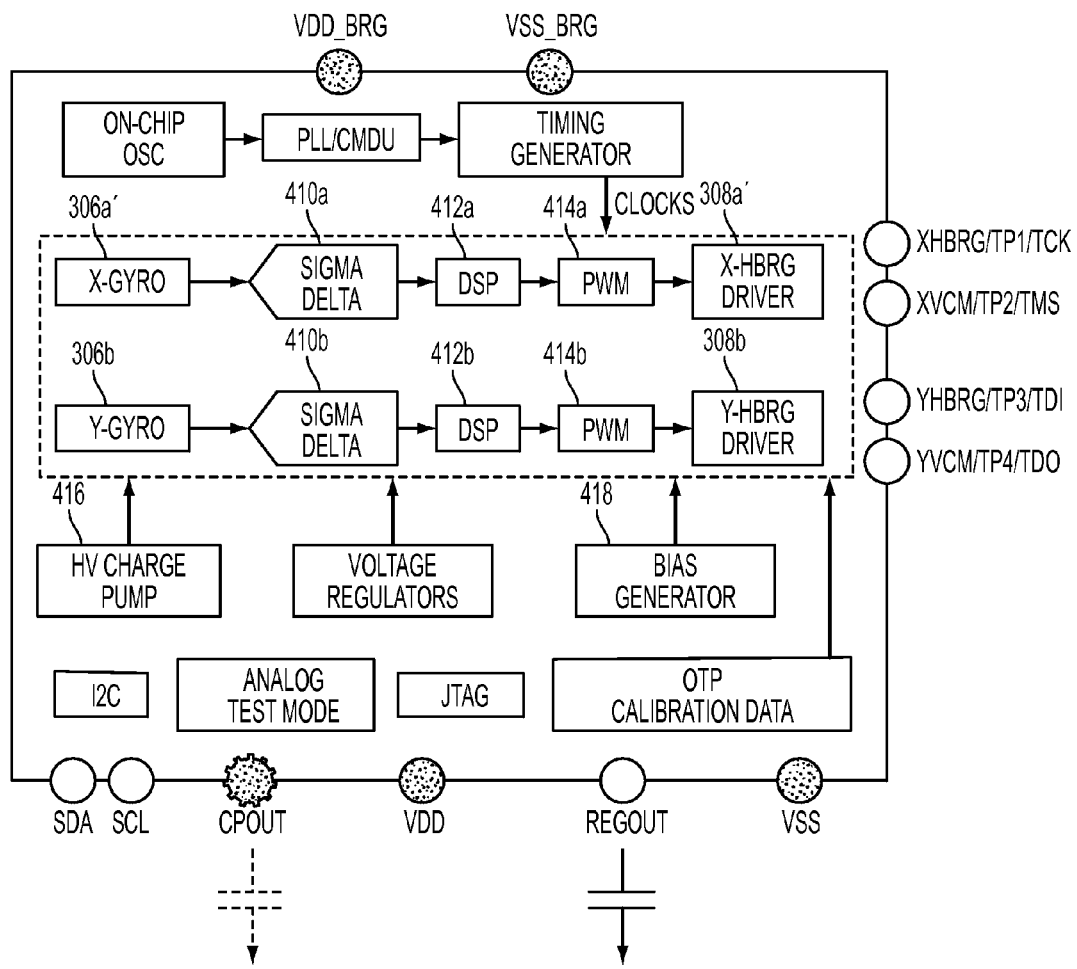
FIG. 4 shows a more detailed description of the block diagram of FIG. 3.

A more detailed description of the block diagram of FIG. 3A is shown in FIG. 4. As is seen, each of the gyroscopes 306a' and 306b' are coupled to its respective sigma delta converters 410a and 410b, a DSP 412a and 412b, and a pulse width modulator 414a and 414b which then provides signals to an H-bridge driver 308a and 308b in both of the respective x and y axes. Each of these chains is controlled by a high voltage charge pump 416, a voltage regulator 417 and a bias generator 418. Through the use of this system, a more robust optical image stabilization controller loop is provided. To further describe the features of this system, refer now to the following figures in conjunction with the accompanying figures.

Figure 5:
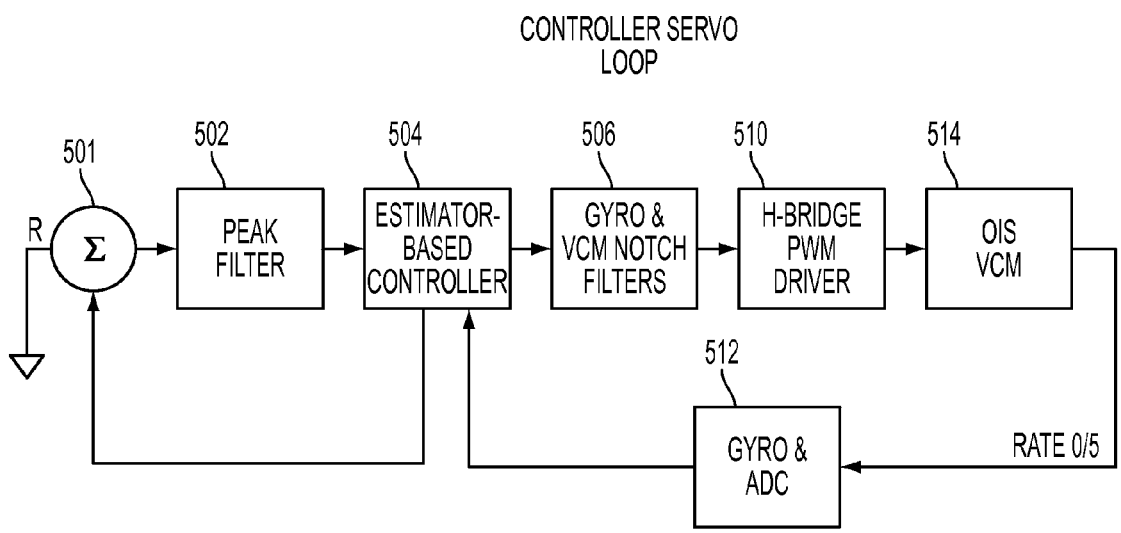
FIG. 5 shows a controller servo loop that is utilized to implement the OIS controller in accordance with an embodiment.

FIG. 5 shows a controller servo loop 500 that is utilized to implement the OIS controller in accordance with an embodiment. The controller servo loop 500 includes a summer 501 which receives a reference signal (R) and provides an input to a peak filter 502. The peak filter 502 in turn provides signals to the estimator based controller 504. This signal is then provided to a plurality of gyroscope and VCM notch filters 506. The filters 506 provide signals to an H BRIDGE PWM driver 510. The driver 510 provides signals to the VCM 514. The VCM 514 provides a signal to the digital gyroscope 512. The signal from the gyroscope 512 is provided to the estimator based controller 504. The estimator based controller 504 then provides an error signal to the summer 501. This signal is fed back to the summer 501 and compared to the reference signal.

The peak filter 502, estimator based controller 504, and filters are preferably signal processing logic and could be implemented in a signal processor. The driver 510 is preferably a mixed signal device. The digital gyroscopes 512 and an O/S VCM 514 are preferably hardware devices.

Through the use of this system, the OIS stabilization is very robust and there is significant integration between the components. There are several elements and algorithms that are of significance in providing this OIS stabilization.

The estimator based controller 504 provides for compensation with no integrators and no differentiators. This provides for a robust system when providing image stabilization. In addition, the peak filter 502 increases rejection gain to a frequency and also improves the stabilization for the low pass notch filter 506. The filters 506 are utilized for attenuating gyroscope errors that are inherent within the system. All these elements operate in cooperation together to provide a more robust system. To describe the features of each of these elements in more detail, refer now to the following description in conjunction with the accompanying Figures.

Estimator Based Controller Compensation

Figure 6:
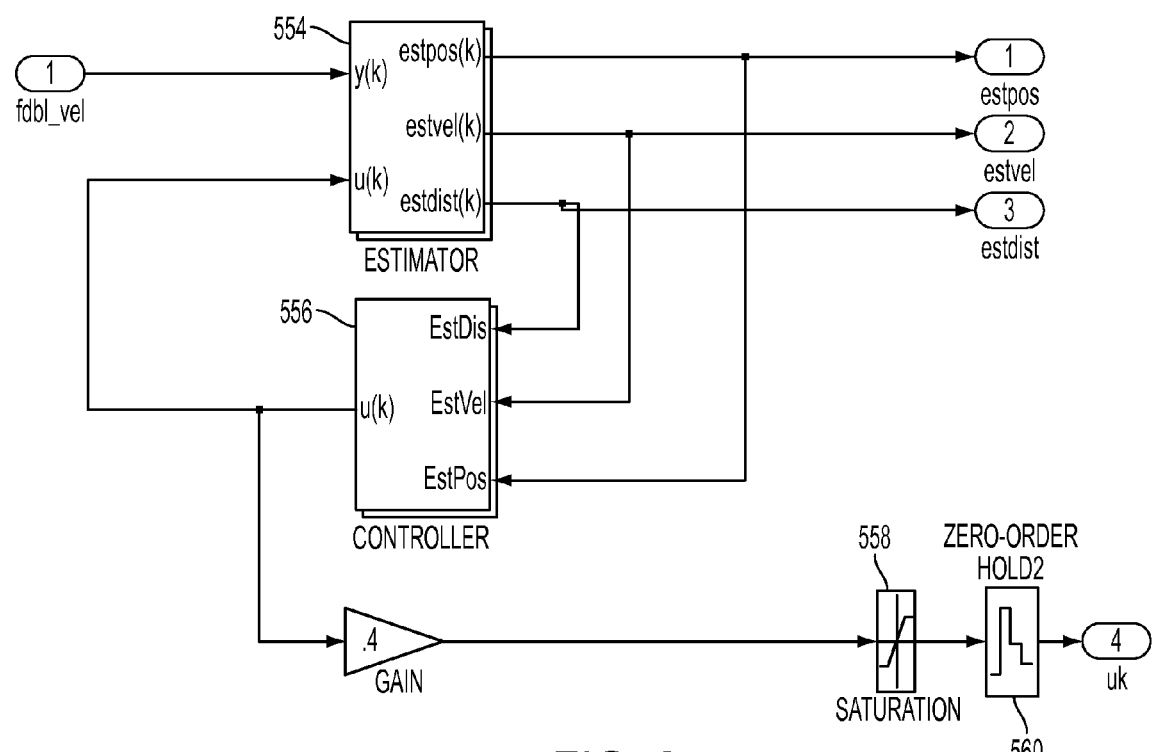
FIG. 6 illustrates the elements of an embodiment of an estimator based controller.

FIG. 6 illustrates the elements of an embodiment of an estimator based controller 502. The estimator based controller 502 includes an estimator based controller 554 coupled to a controller 556. The control output from the controller 556 is further limited by a saturation element 558.

Difference equations for the estimator based controller 502 are shown below.

$gVel = fbk\_vel = y(k)$ $Error(n) = gVel(k) - eVel(k)$ $ePos(k+1) = PHIe11*ePos(k) + PHIe12*eVel(k) + PHIe13*eDist(k) + Ge1*u(k) + Le1*Error$ $eVel(k+1) = PHIe21*ePos(k) + PHIe22*eVel(k) + PHI23*eDist(k) + Ge2*u(n) + Le2*Error(n)$ $eDist(k+1) = PHIe31*ePos(k) + PHIe32*eVel(k) + PHIe33*eDist(k) + Ge3*u(k) + Le3*Error(k)$ gVel: Gyroscope's angular velocity measurement
ePOS: estimated position
eVel: estimated velocity
eDist: estimated disturbance PHIe11, PHIe12, PHIe13, PHIe21, PHIe22, PHIe23, PHIe31, PHIe32, PHIe33, Ge1, Ge2 and Ge3 are model coefficients. Le1, Le2, Le3 are estimator based controller gains.

Figure 7:
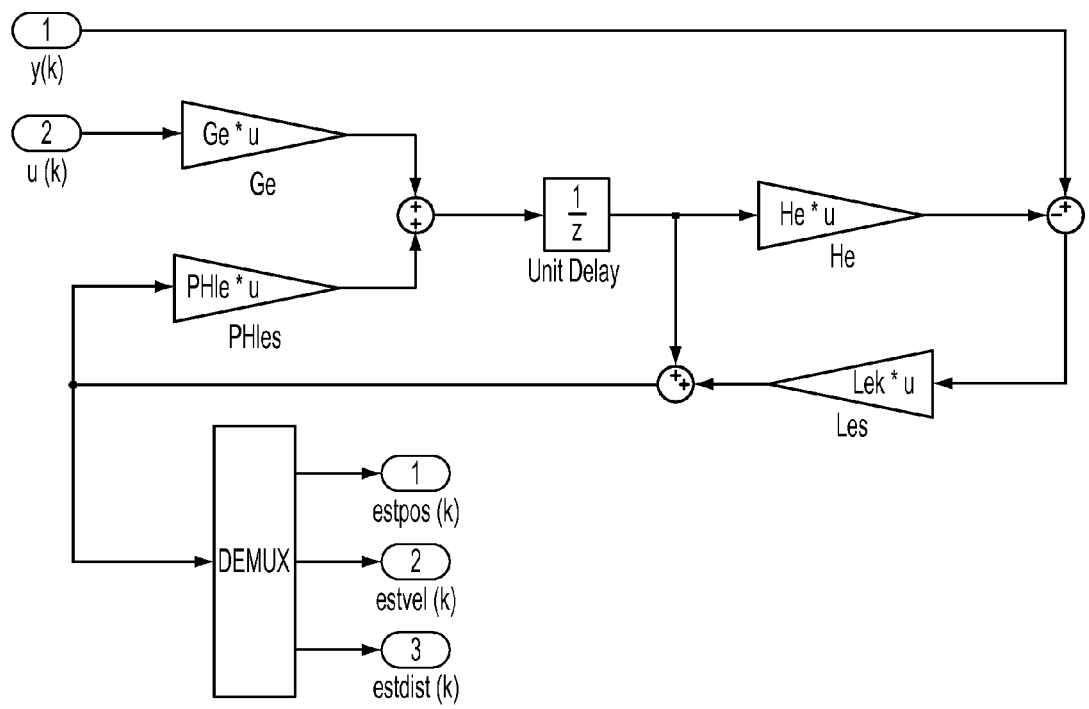
FIG. 7 illustrates the output command generator.
Figure 8:
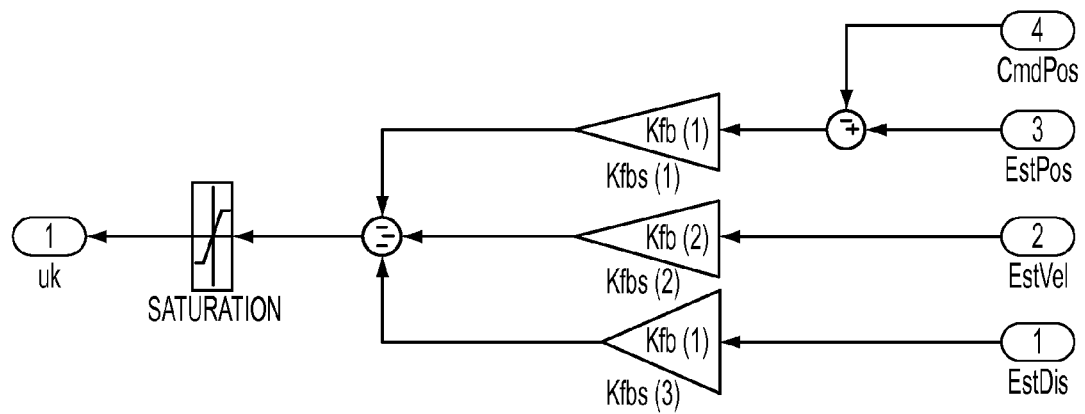
FIG. 8 illustrates a graphical representation of the estimator based controller.

The output command generator is shown in FIG. 7. The output command is a control signal. Each state variable is part of the control output. The control output is a weighted summation of all the estimated state variables.

$u(n) = Kfb(1)*ePos(k) + Kfb(2)*eVel(k) + kfb(3)*eDist(k)$ kpos, kvel, and kdist are controller gains $Xg(k) = u(k)$ The estimator based controller based servo control is the same for a MIMO structure as that of single-input-single-output (SISO) structure. The direct input to the estimator based controller can be angular velocity. The control objective can be, for example, angular velocity to be zero, which means the CCM is stand-still, which keeps the module altitude the same as before the camera shutter is triggered. For the angular control loop, the angular reference is provided by the upper level module and the angular loop error is the difference between the estimated angular from the estimator based controller and the angular reference point.

Peak Filter

Figure 9A:
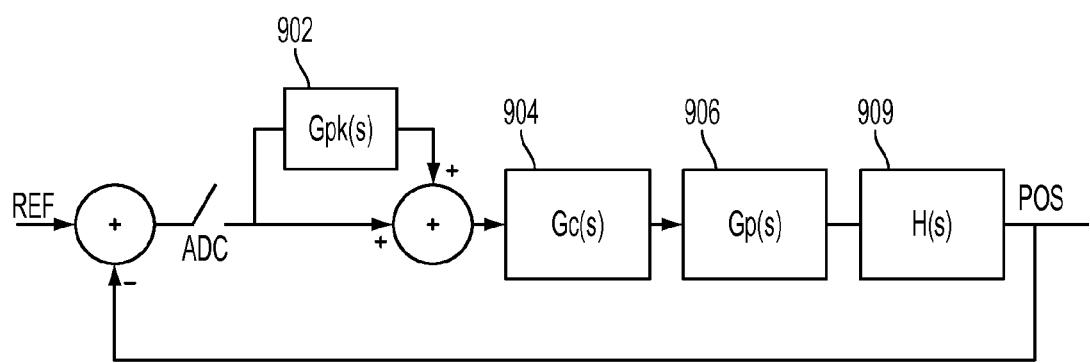
FIG. 9A is a block diagram of the OIS loop including a peak filter.

FIG. 9 is a block diagram of the OIS loop including a peak filter. In this embodiment Gpk(s) 902 represents the peak filter, Gc(s) 904 represents the loop compensator, GP(s) 906 represents the VCM, and H(s) 908 represents the feedback sensor. The peak filter is utilized to increase rejection gain to the hand jitter frequencies.

The goal of Optical Image Stabilization (OIS) in digital still cameras (DSC) or handsets (HSO) is to reject the vibration caused by hand jitter while taking a photograph. The frequency range of this jitter is concentrated in the narrow band of 2 to 18 Hz. One way to improve the rejection of the OIS closed loop system of these frequencies is to increase the overall bandwidth of the loop in order to have more gain at low frequencies. But there is a limit to how far the bandwidth can be increased before running into stability problems due to mechanical resonances of the Voice Coil Motor (VCM) or gyroscope if they are used in the feedback loop.

The peak filter attempts to resolve this by increasing the gain of these frequencies in the forward loop without effecting stability. The filter comprises a pair of lightly damped poles within a bi-quad filter structure.

The bi-quad filter structure is good for transfer function with complex pole/zero. Both the peak filter and notch filter contain the complex pole and zeros. Therefore, the bi-quad filter is best for these 2 filters. The peak filter and notch filter can be shared by the two sub-paths for the same VCM actuator control output.

The transfer function of the bi-quad filter is as follows:

$$\frac{b_c + b_2 * z^{-1} + b_a * z^{-2}}{1 + a_2 + z^{-2} + a_2 * z^{-2}}$$

Figure 9B:
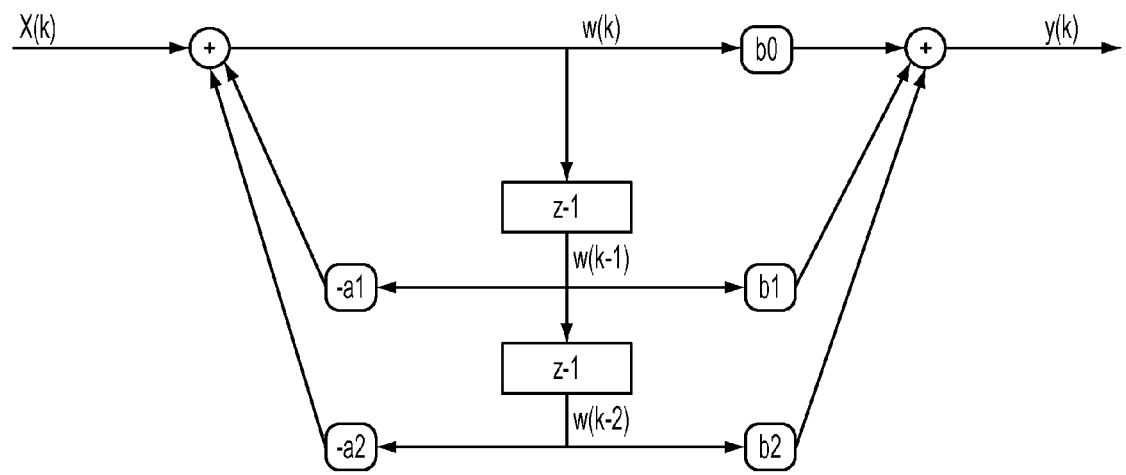
FIG. 9B shows the bi-quad filter construction.

A bi-quad filter construction is shown in FIG. 9B.

The IIR filter in FIG. 3B is a generic filter, which can be an estimator based controller or a series of first order filter with maximum $4^{th}$ order. For example, a second order filter equation is described:

$$kg \frac{(1 + ka * z^{-2})(1 + ka * z^{-1})}{(1 + ka * z^{-1})(1 + kf * z^{-1})}$$

Figure 9C:
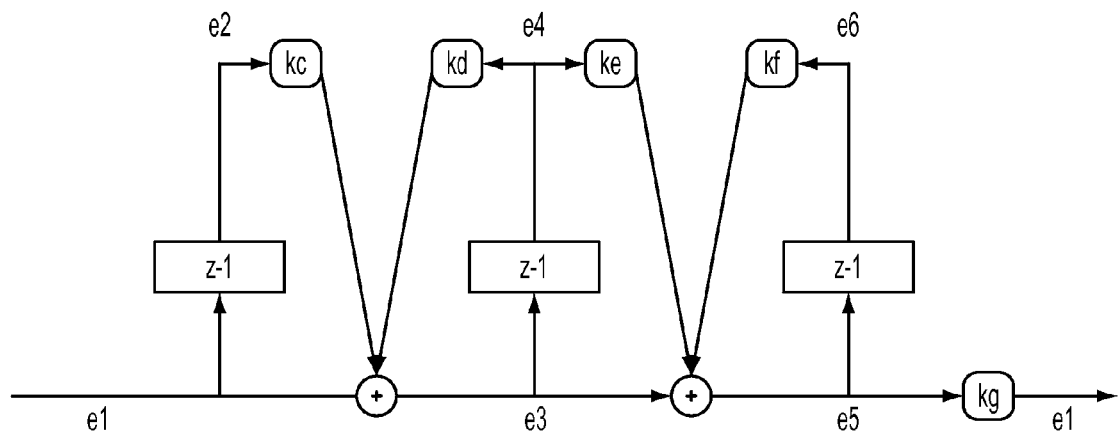
FIG. 9C shows the second order IIR filter construction.

The second order IIR filter can be implemented as in FIG. 9C.

VCM (Voice Coil Motor Model)

The purpose of the OIS servo compensator is to drive the VCM to compensate for the angular position error caused by the external disturbances. As above described the concept of the peak filter is to provide extra boost to the hand jitter frequencies in the forward loop. The range of frequencies under consideration is 2 to 18 Hz and the goal is to provide rejection gains of 40 dB or higher. The spring of the VCM will be designed such that the whole mechanical structure acts also as a predefined mechanical filter where its dynamic characteristics are a band pass filter. When such a band pass filter is placed in a closed loop servo it adds to the loop's error rejection response to the frequencies in the band pass.

Figure 10:
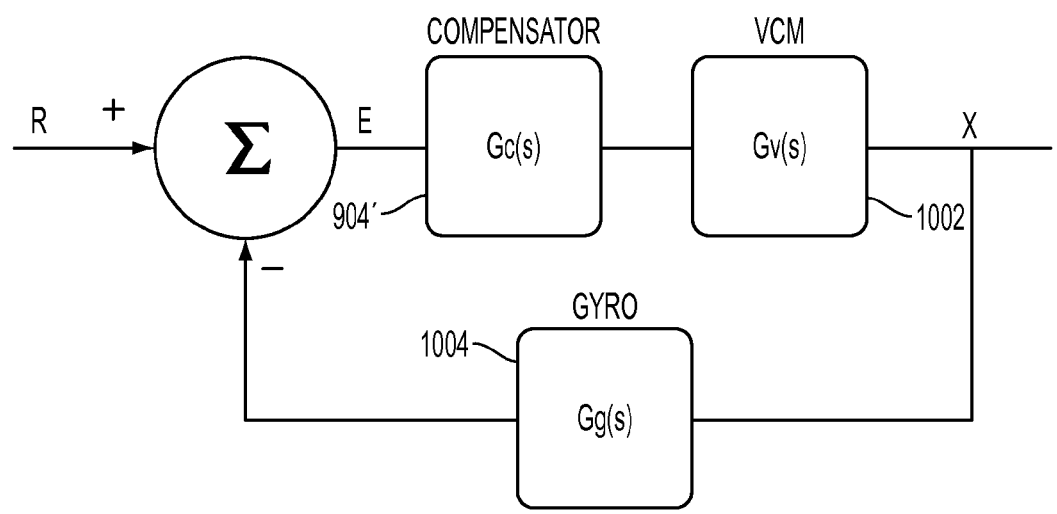
FIG. 10 represents a closed loop OIS control system.

FIG. 10 represents a closed loop OIS control system. In FIG. 10, R is the hand jitter input, X is the position of the VCM, E is the error between the measured position and jitter position, Gc(s) 904' represents the loop compensator, Gv(s) 1004 represents VCM transfer function, Gg(s) 1006 represents the gyroscope plus position integrator transfer function. T(s) is a closed loop transfer function of the closed loop control system.

$$T(s)=X(s)/R(s)$$

$$T(s)=Gc(s)*Gv(s)/(1+Gc(s)*Gv(s)*Gg(s))$$

To study the effects of the hand jitter and the loop's rejection to those frequencies it is better to use the error function E(s):

$$E(s)=1/(1+Gc(s)*Gv(s)*Gg(s))$$

Figure 11:
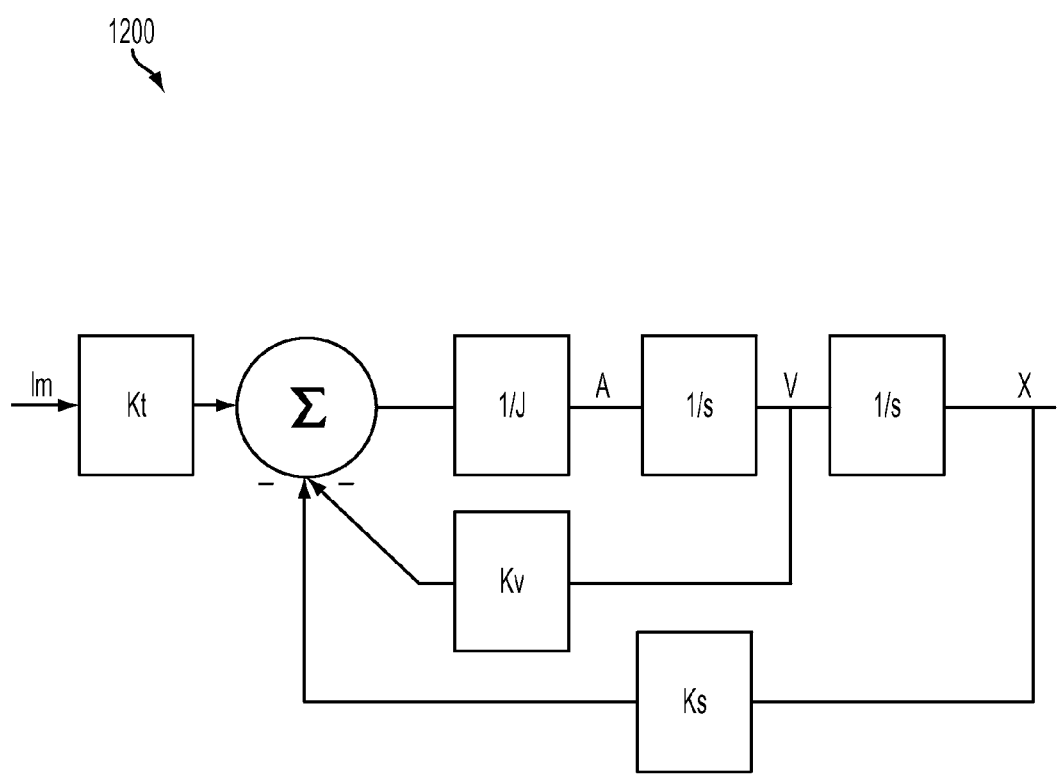
FIG. 11 is a model of a spring based VCM of FIGS. 2A-2C where the input is current and the output is position.

FIG. 11 is a model of a spring based VCM of FIGS. 2A-2C where the input is current and the output is position.

Figure 12:
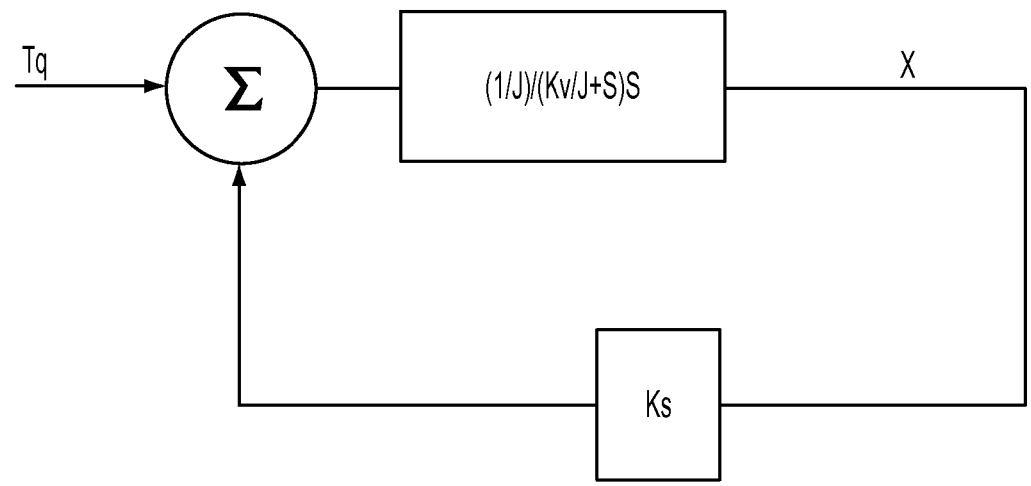
FIG. 12 illustrates a further simplification of the model of FIG. 11.

A further simplification of the model of FIG. 11 is shown in FIG. 12.

The transfer function from position X to input torque Tq becomes:

$$G(s)=X(s)/Tq(s)$$

$$G(s)=(1/J)/(S^2+(Kv/J)S+(Ks/J))$$

Where:
Kt is the VCM torque constant in N-m/amp.
Fn: natural or fundamental frequency.

$$Fn=\sqrt{(Ks/J)}/(2*pi)$$

Kv is velocity related friction coefficient and is directly related to the VCM damping and the peak of the resonance.

The following simulations illustrate how frequency and gain of the VCM changes as spring constant Ks and Kv change.

Figure 15A:
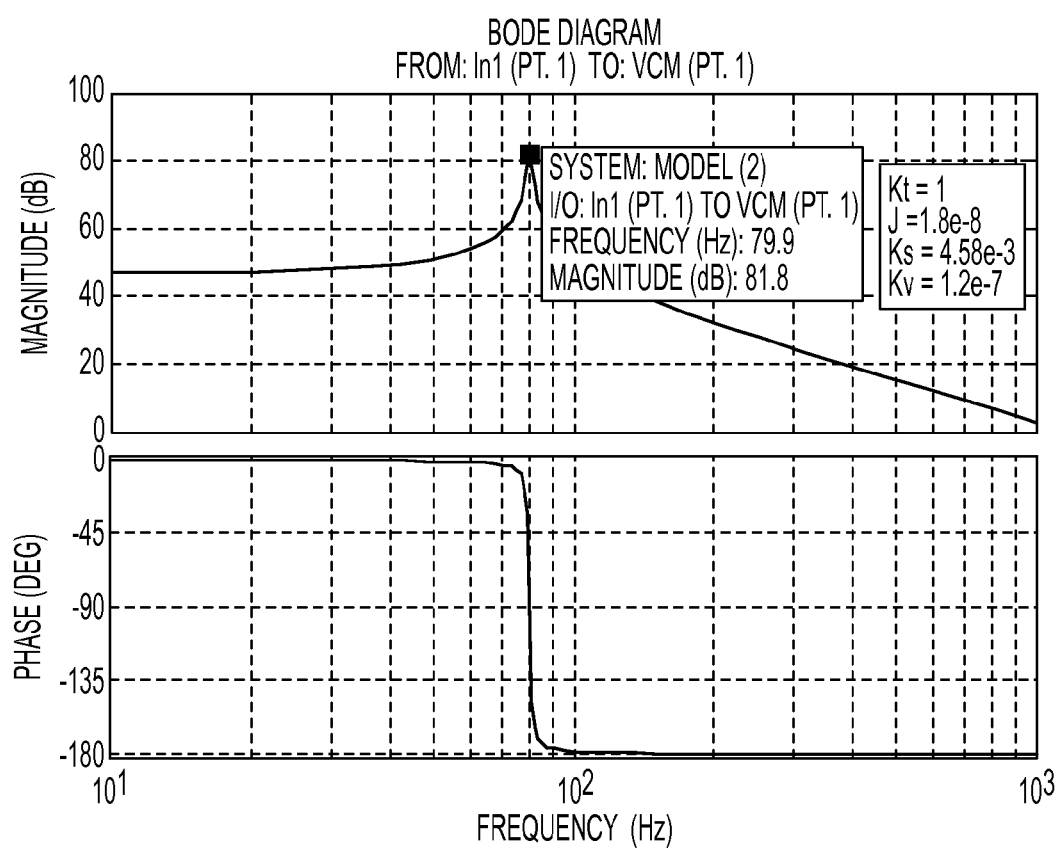
FIGS. 15A-15P are simulations and tables that illustrate how frequencies and changes in spring constant Ks and Kv change.

Frequency response of the VCM.
Fn=80 hz.
To simplify the equations let Kt=1. The simulation is shown in FIG. 15A.

Figure 15B:
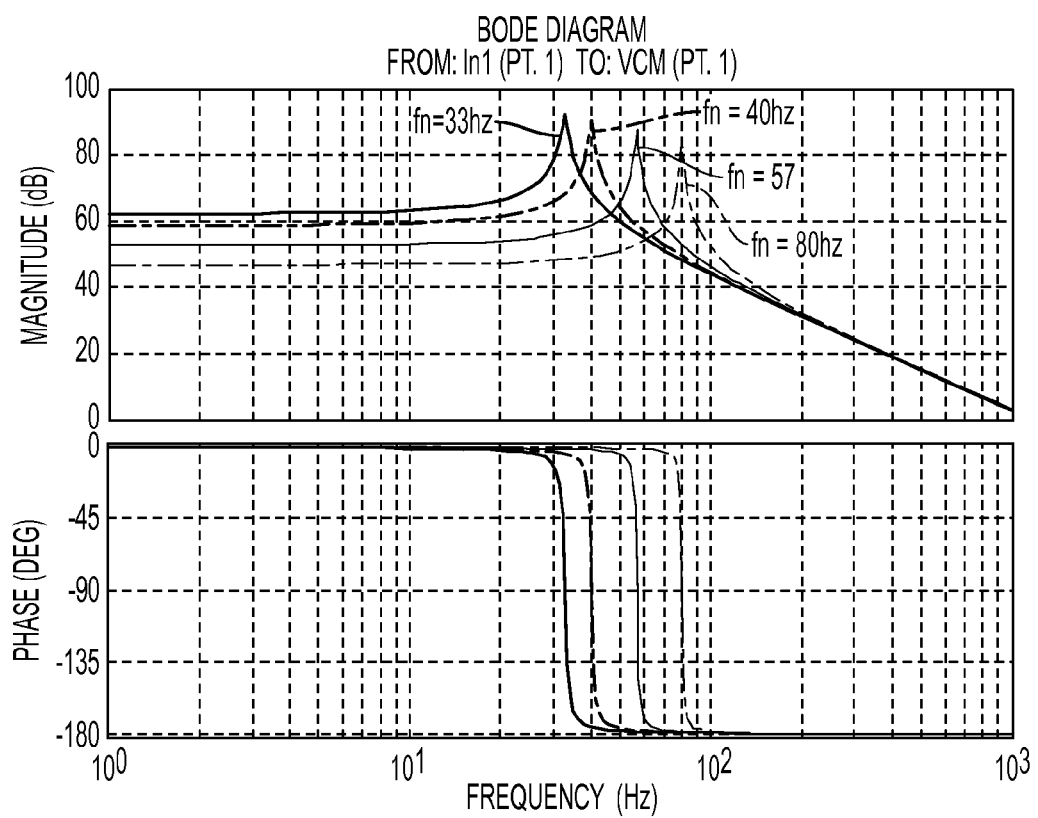
Figure 15C:
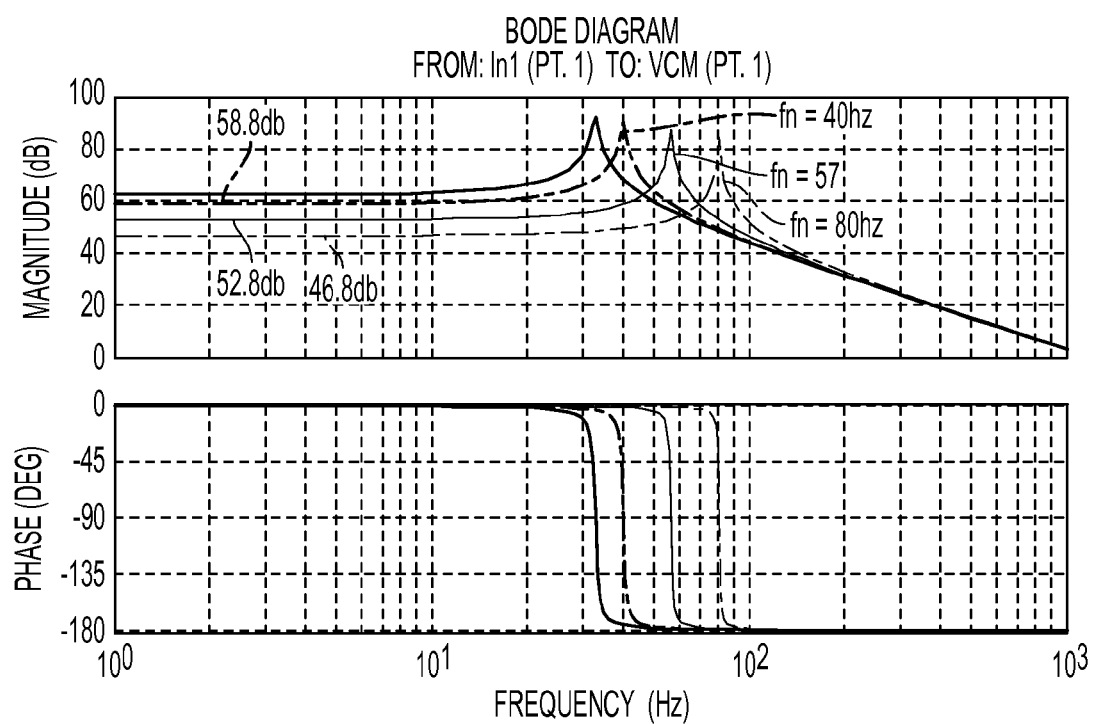

The simulations of FIGS. 15B and 15C show VCM frequency response with different spring constants. As the spring constant goes up, the frequency goes up and with the same inertia, and the DC gain drops.

Figure 15D:
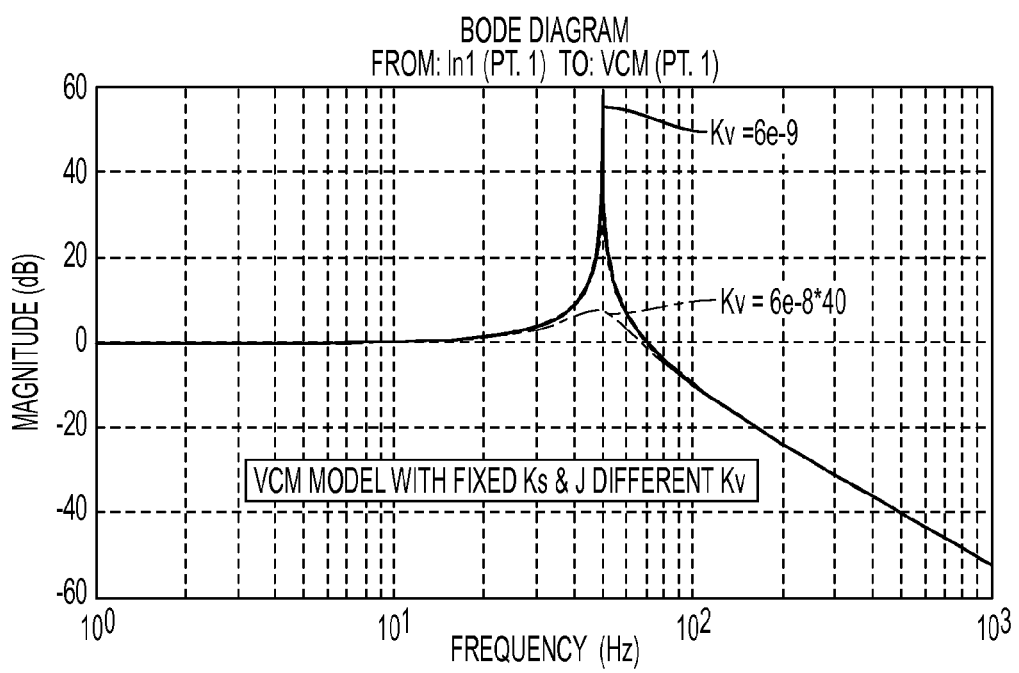

In FIG. 15D, Kv is changed but inertia and Ks are kept constant.

Figure 15E:
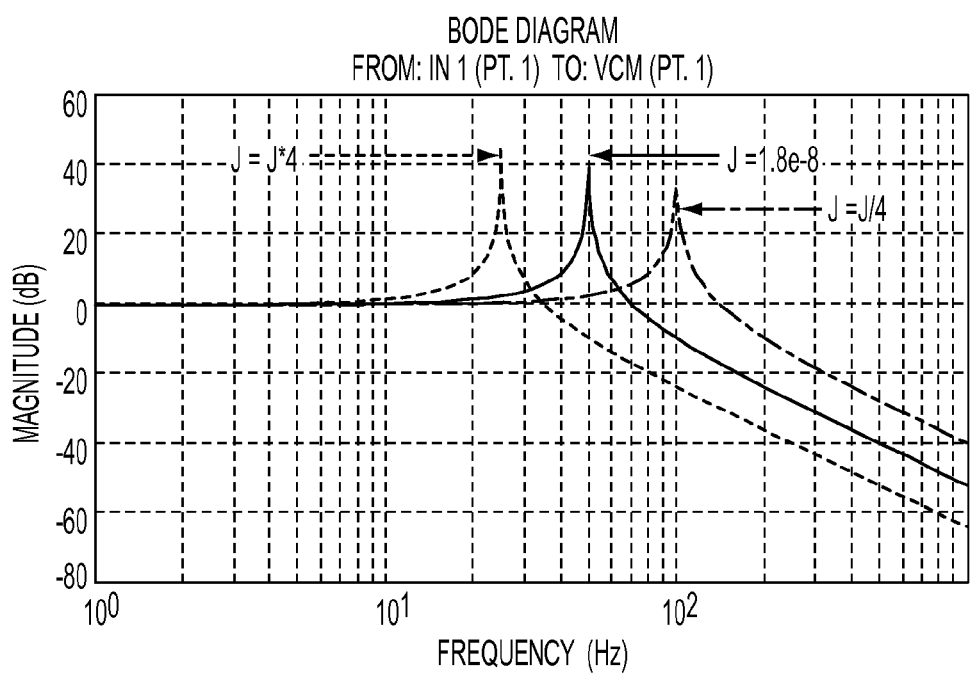

In FIG. 15E only the inertia is changed.

Reducing the fundamental frequency ($F_n$) by 2× increases the rejection gain at 1-15 hz by 12 dB or 4×.

From these simulations it is determined that the only parameter that effects the gain of the VCM at low frequencies is the spring constant Ks.

Compensator (Estimator Based Controller) Frequency Response

Open loop frequency response with estimator based controller $$Gol(s)=Gc(s)*Gv(s)*Gg(s)$$

Figure 15F:
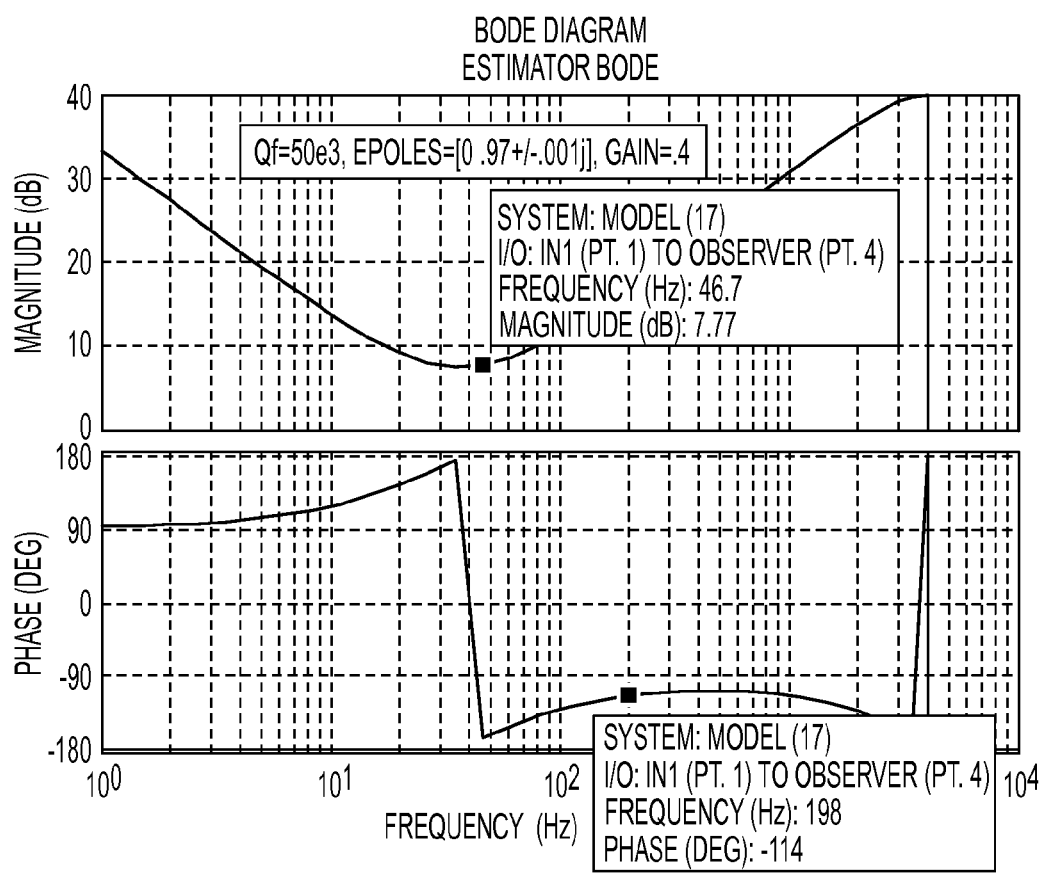

The open loop response shown in FIG. 15F includes the estimator based controller, VCM and Gyroscope plus integrator transfer functions.

Figure 15G:
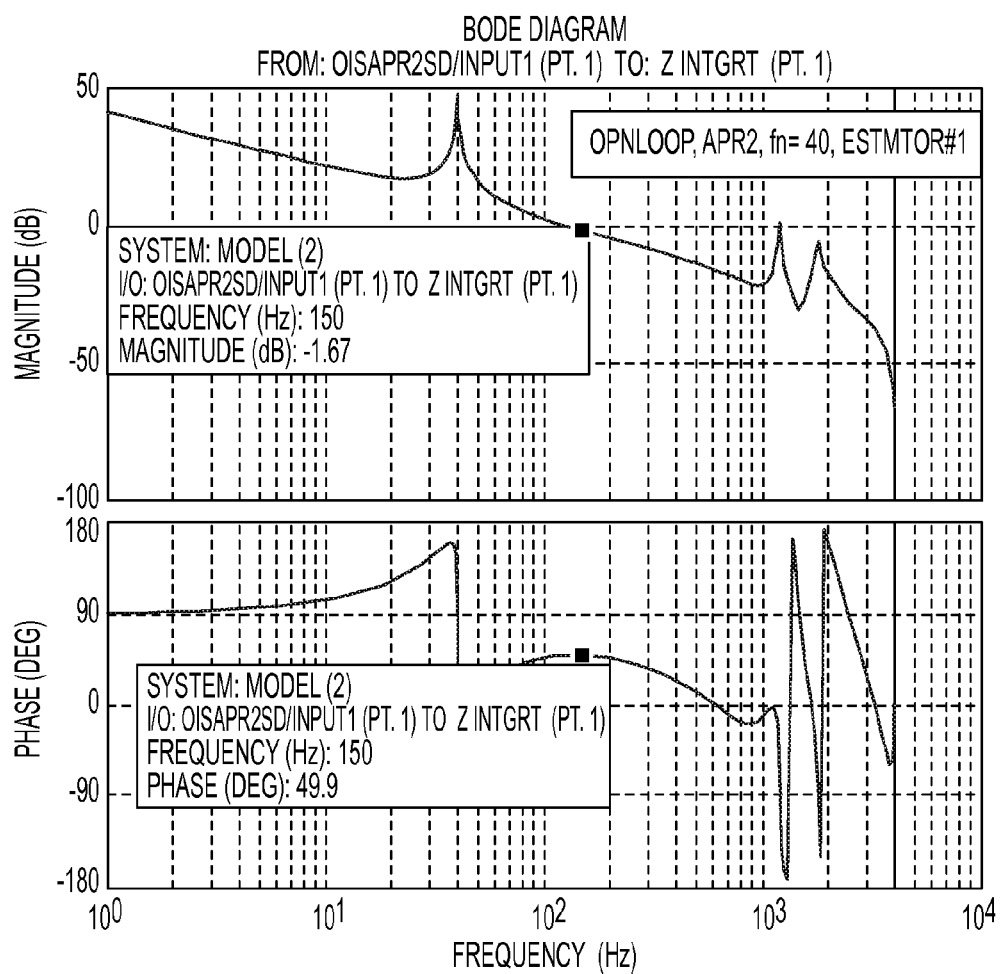
Figure 15H:
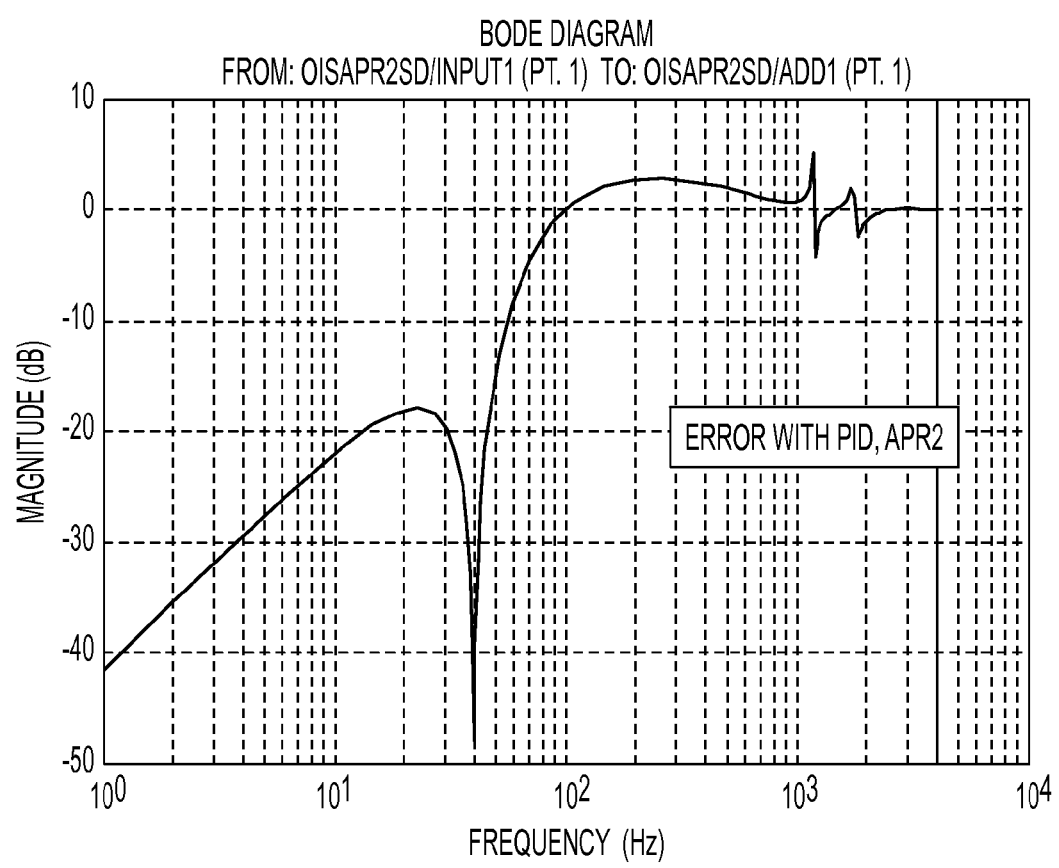

The first peak as shown in FIG. 15G represents the resonant response of the VCM. The error function transfer function (Es) with the fundamental frequency of VCM=40 Hz. As the plot in FIG. 15H shows, without any additional filtering or redesign of the VCM, the error function does not have enough rejection for the jitter frequencies of 1 to 18 Hz. All the values are below 40 dB.

Figure 15I:
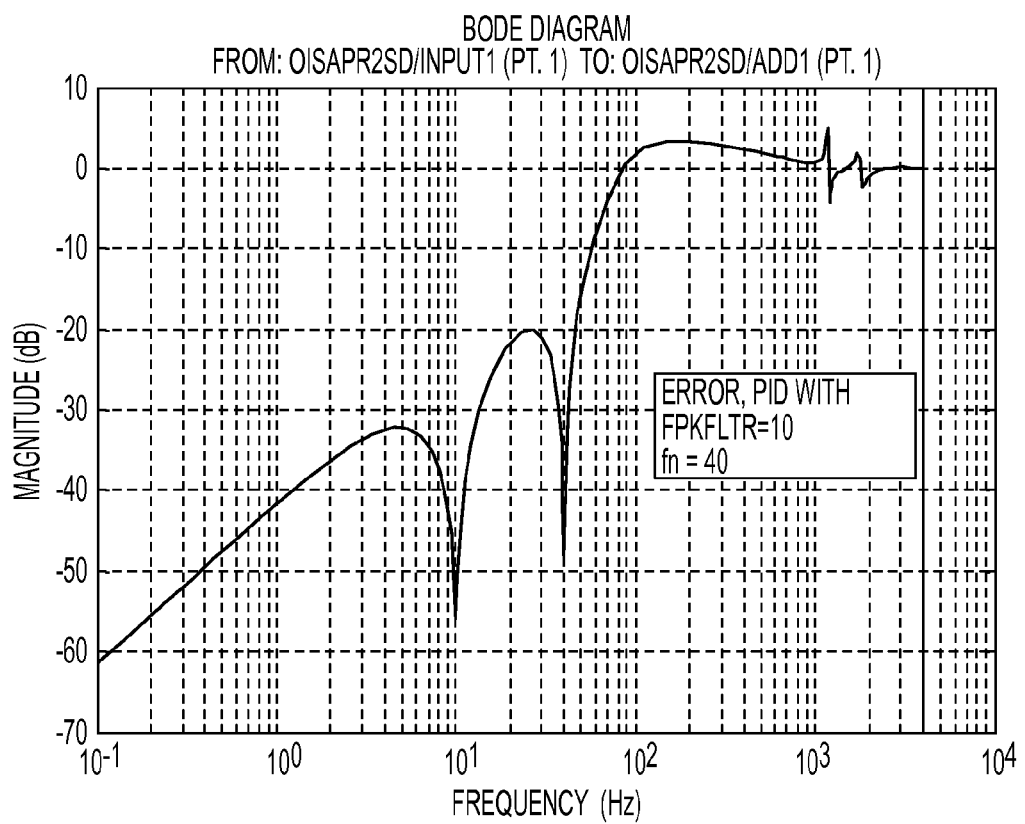

In a first case as shown in FIG. 15I, a $2^{nd}$ order Peak filter is added at Fpk=10 Hz.

As is seen in the table of FIG. 15J, only at 10 Hz are there rejections better than 40 dB.

Figure 15K:
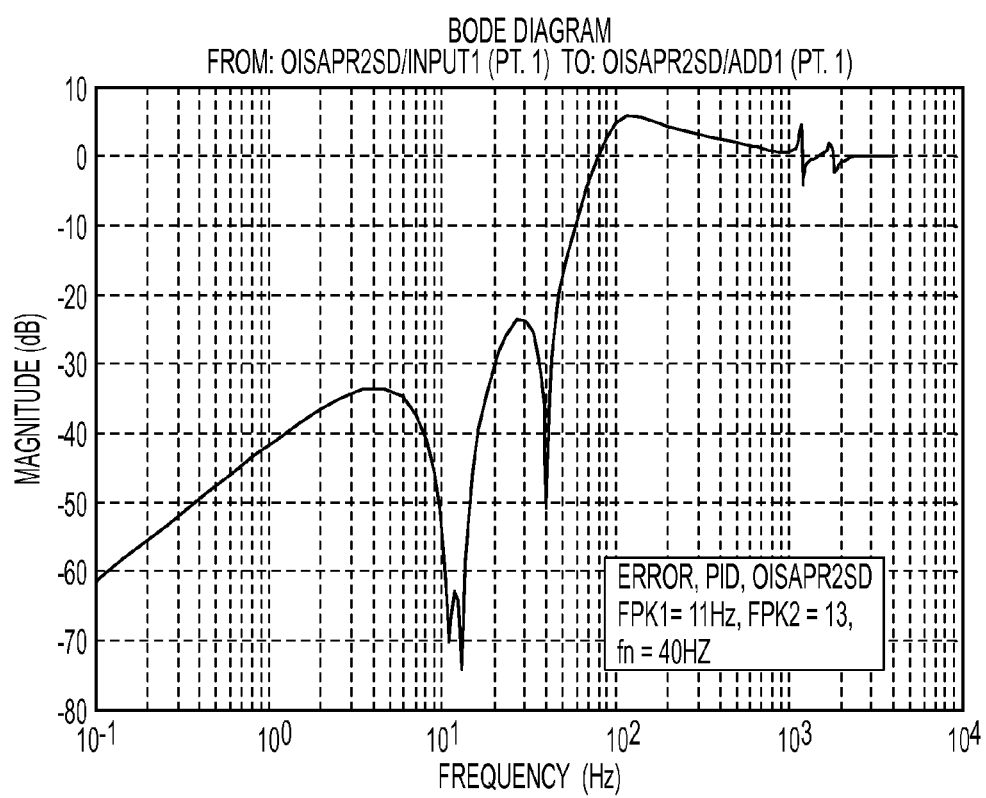

In a second case as is shown in FIG. 15K, 2 Peak filters are added, Fpk1=11 Hz, Fpk2=13 Hz.

These results as shown in the table of FIG. 15L are better but 2 Peak filters per axis add to the complexity of the hardware and can cause settling delays and stability problems.

Figure 15M:
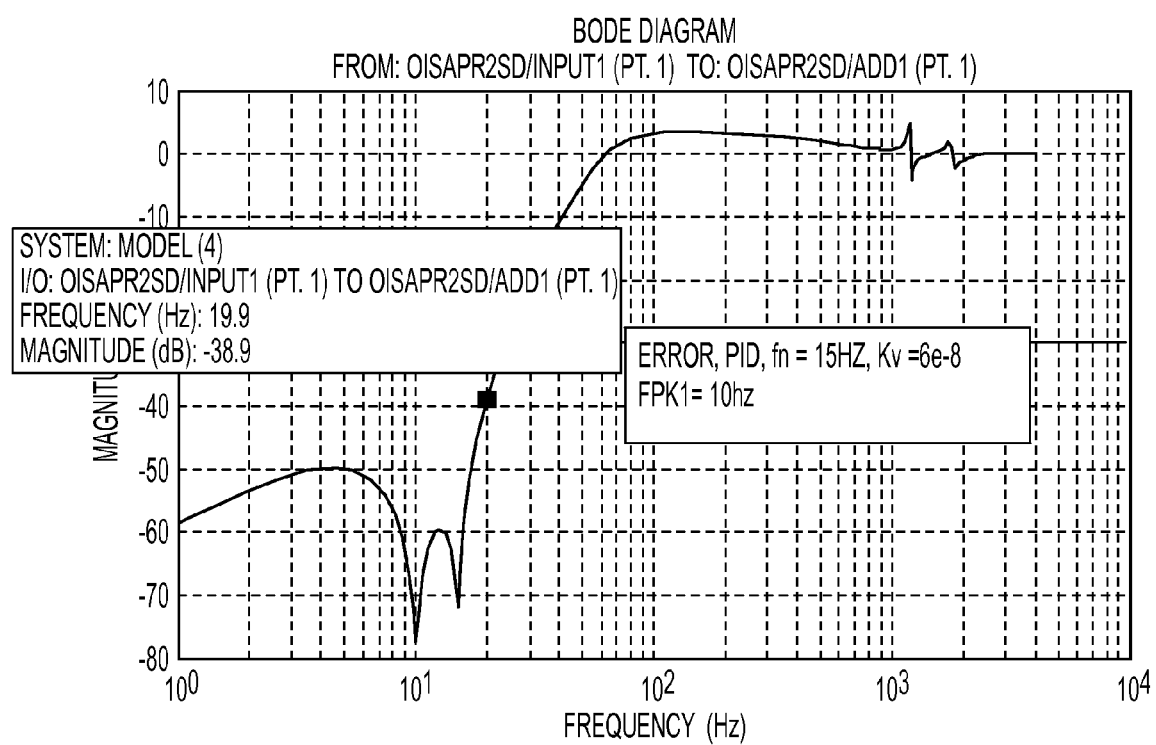

In a third case as shown in FIG. 15M, natural resonance frequency of the VCM is moved to 15 Hz plus one Peak filter at 10 Hz.

As is seen in the table of FIG. 15N, all the frequencies below 20 Hz have above 40 dB rejection. This is a very good result.

Figure 15O:
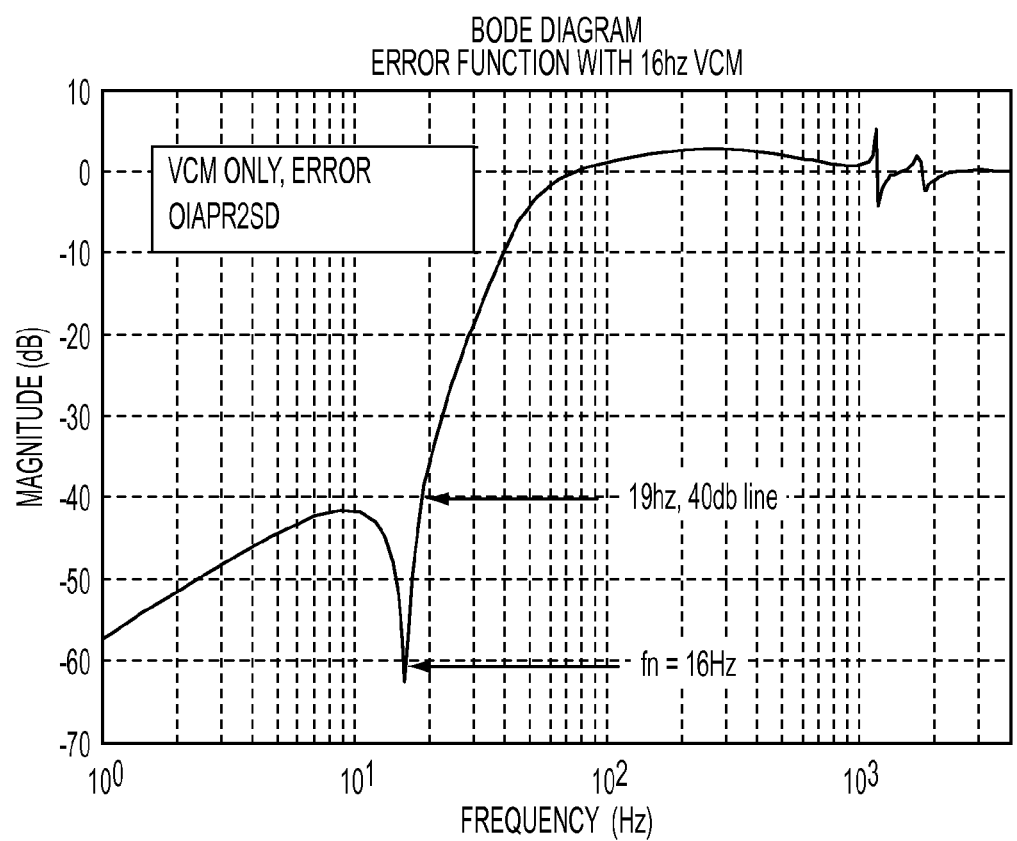

In a fourth case as shown in FIG. 15O, a modified VCM is utilized at 16 Hz and no Peak filter.

This is also an acceptable result as shown in the table of FIG. 15P.

Nonlinear Control to Improve System Robustness

A VCM dynamic model can be described by a 2-state state space equation (angular position P and angular velocity V) with the input of the VCM being the angular acceleration (equivalent to VCM driving current minus the observed disturbances). The MEMS gyro can physically measure the angular velocity V. The estimator based controller estimates the position. Therefore, both the position and velocity variables are available to calculate the control effort (or VCM driving current).

When all the states in the camera module can be estimated through estimator based controller algorithm, a complex nonlinear control strategy can be employed to significantly increase the system robustness under any abnormal situation.

There are basically three operating modes of the nonlinear control:

a. Closed loop angular position control. The control effort is a linear combination of the position error and velocity error. If the angular position is close to target and the velocity is small enough, the control effort is:

$$u=k_p*(\hat{P}-r_p)+k_v*V$$

b. Closed loop angular velocity control. The control effort is propositional to the velocity error. In this mode, the angular position is far away from the target. The velocity reference (or profile) is created by a nonlinear function of the position error. The control effort is:

$$u=k_2*(r_v-V)$$

$$r_v=f(\hat{P}-r_p)$$

Figure 13:
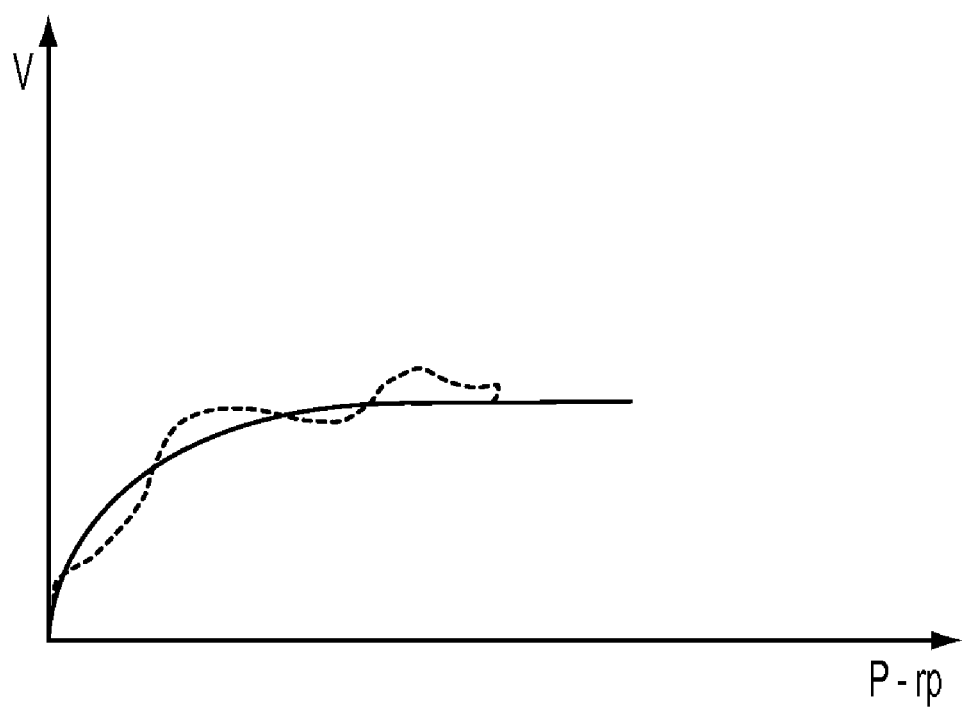
FIG. 13 shows the velocity profile (function of position error) in phase plane.

In a phase plane, the velocity is following the profile in this control mode, as shown in FIG. 13. FIG. 13 illustrates the velocity profile (function of position error) in phase plane. The solid line in FIG. 13 is the velocity profile $r_v$. The dash line is the real movement of the VCM velocity under disturbances.

c. Open loop acceleration control. The control effort is a constant value to drive VCM in a constant acceleration model. The control effort is a constant $u=C_3$.

Figure 14:
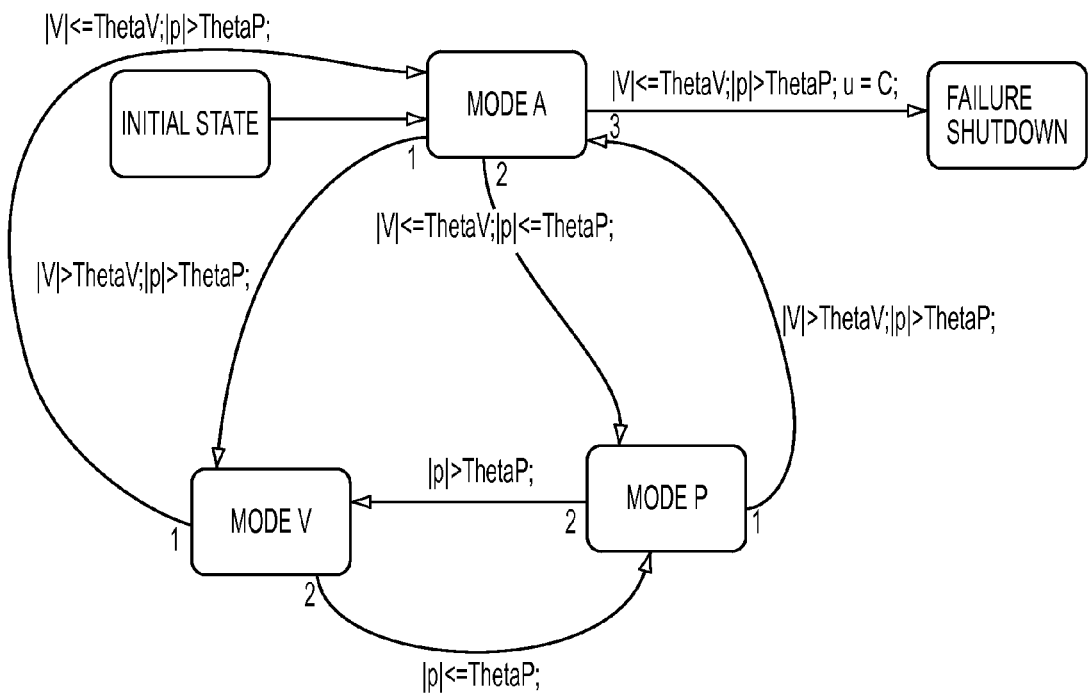
FIG. 14 shows the state transition diagram for nonlinear control of the CCM.

The system control is described by the transition between these 3 control modes. The state transition can be depicted in FIG. 14.

There are 2 criteria in the state transitions:
1. Angular position |p| is compared with the threshold ThetaP;
2. Angular velocity |v| is compared with the threshold ThetaV.

There are five states in this state diagram:
1. Initial state: power on system reset state;
2. Mode A state: constant acceleration state;
3. Mode V state: velocity control state;
4. Mode P state: position control state;
5. Failure shutdown state: One of the VCM actuator is jammed. The system cannot work properly and needs shutdown to protect the system hardware.

Before the power on reset (camera is not operating), the CCM is locked to prevent damage from the unexpected handset movements (like dropping on the ground). This is the same as car parking when it is not in driving situation. During the power on reset, the CCM needs to move as fast as possible to the operating point. Then the position servo loop can be closed when the position error is zero to minimize the loop acquisition transient.

During shock, the CCM will be moved away from the operating point and the VCM actuator is saturated. The high gain position control is not suitable in this situation. A different mode (such as velocity control or acceleration control mode) will be used during the shock period. After the shock is over, the velocity mode will be used to pull back the loop to position high gain loop.

VCM actuator protection during drive failure. If the VCM actuator is jammed, there is always position loop error for relatively long time even when the control effort is set to maximum. At this time, the servo loop should be shut down.

Conclusion

A system and method in accordance with the present invention includes a highly integrated OIS system that is lower in cost and small in size. Therefore the system can be placed on a single chip. Furthermore a high bandwidth digital gyroscope is utilized to estimate the angular position sensor. This eliminates the need for a Hall element and its associated circuitry that is typically utilized in OIS systems. This further reduces the size of the chip. The system has a proven control loop understanding and know-how, and it has a proven high volume production capability. Through the use of a novel peak filter design, increasing the gain at the frequency of interest through the use of the VCM and also selectively changing the spring constant of the VCM, a robust optical image stabilization system is provided.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical image stabilization system for a camera module comprising:
   a voice coil motor (VCM),
   at least one gyroscope; and
   signal processing logic for receiving a signal from the at least one gyroscope and for driving the VCM, and comparing the signal to a reference signal and providing a stabilized image based upon that comparison, wherein the signal processing logic comprises a peak filter, an estimator based controller and nonlinear control, wherein the signal processing logic and the at least one gyroscope reside on the same chip.

2. The optical image stabilization system of claim 1, wherein at least one gyroscope is a digital gyroscope.

3. The optical image stabilization system of claim 1, wherein the digital gyroscope is a dual axis gyroscope.

4. The optical image stabilization system of claim 1, wherein a Hall element is not required.

5. The optical image stabilization system of claim 1, wherein signal processing logic is within the at least one gyroscope.

6. The optical image stabilization system of claim 1, wherein the signal processing logic is hard-coded.

7. The optical image stabilization system of claim 1, wherein the peak filter increases the gain of low frequency in the forward loop without effecting stability.

8. The optical image stabilization system of claim 1, wherein the peak filter comprises a pair of lightly damped poles within a bi-quad filter structure.

9. The optical image stabilization system of claim 1, wherein the signal processing logic includes notch filters.

10. The optical image stabilization system of claim 1 wherein a flexible multi-input-multi-output (MIMO) control architecture utilizes electronics and control design to overcome mechanical design limitation of x-y cross dynamic coupling.

11. The optical image stabilization system of claim 1 wherein a nonlinear control system is utilized to improve system robustness and machine intelligence is incorporated with feedback control to overcome the limitations associated with linear control systems.

12. The optical image stabilization system of claim 11 wherein the nonlinear control system transitions between three control modes: an acceleration state, a velocity state and a position control state.

13. The optical image stabilization system of claim 11 wherein an intelligence of the nonlinear control system provides hardware protection against any failures during operations.

14. An optical image stabilization system for a camera module comprising:
   a voice coil motor (VCM),
   a first gyroscope for providing a first estimation of the angular position in a first direction;
   a second gyroscope for providing a second estimation of the angular position in a second direction; and
   an estimator based controller for receiving signals from the first and second gyroscopes and outputting an angular position signal; and signal processing logic for receiving, and comparing the angular position signal to a reference signal to drive the VCM and providing a stabilized image based upon that comparison, wherein the signal processing logic comprises a peak filter, wherein the peak filter increases the gain of low frequency in the forward look without effecting stability, wherein the signal processing logic, and the first and second digital gyroscopes reside on the same chip.

15. The optical image stabilization system of claim 14, wherein the first and second gyroscopes are digital gyroscopes.

16. The optical image stabilization system of claim 14, wherein a Hall element is not required.

17. The optical image stabilization system of claim 14, wherein signal processing logic is within at least one of the first and second gyroscopes.

18. The optical image stabilization system of claim 14, wherein the peak filter comprises a pair of lightly damped poles within a bi-quad filter structure.

19. The optical image stabilization system of claim 14, wherein the signal processing logic includes notch filters.

20. The optical image stabilization system of claim 14, wherein the signal processing logic resides in one or more digital signal processors.

21. The optical image stabilization system of claim 14, wherein the signal processing logic is hard coded.

22. A method for providing optical image stabilization for a camera module; the method comprising:

receiving a reference signal by a summation element;

providing a signal from the summation element to a peak filter, the peak filter provides a filtered signal to increase rejection gain of hand jitter frequencies;

providing the filtered signal to an estimator based controller, the estimator based controller provides for compensation of the filtered signals with no integrators or differentiators;

providing the compensated filtered signal to notch filters, wherein the notch filters attenuate the compensated filtered signals for gyroscope errors;

utilizing the compensated filtered signal to drive a voice coil motor (VCM) to provide a corrective movement to the camera module;

sensing the corrective movement by a gyroscope to provide a resultant signal;

providing the resultant signal to the estimator based controller to provide a compensated signal; and providing the compensated signal to the summation element to be compared with the reference signal.

\* \* \* \* \*